US012782188B2

(12) United States Patent
Jones et al.

(10) Patent No.: US 12,782,188 B2
(45) Date of Patent: Nov. 3, 2026

(54) MULTI-SENSOR SYSTEM FOR AUTOMATICALLY TARING MOBILE PRODUCE SCALES

(71) Applicant: Amazon Technologies, Inc., Seattle, WA (US)

(72) Inventors: Jonathan David Jones, Arlington, VA (US); Vinod Krishnan Kulathumani, Boston, MA (US); Jacob A. Siegel, Boston, MA (US); Tanay Shah, Austin, TX (US); Nicholas Alan Koulopoulos, Boston, MA (US); Heather Gass, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 387 days.

(21) Appl. No.: 18/615,900

(22) Filed: Mar. 25, 2024

(65) Prior Publication Data

US 2025/0297885 A1 Sep. 25, 2025

(51) Int. Cl.
*G01G 19/44* (2006.01)
*B62B 3/14* (2006.01)
*G01G 19/414* (2006.01)

(52) U.S. Cl.
CPC ......... *G01G 19/414* (2013.01); *B62B 3/1424* (2013.01); *B62B 3/1428* (2013.01)

(58) Field of Classification Search
CPC .... G01G 19/414; B62B 3/1424; B62B 3/1428
See application file for complete search history.

(56) References Cited

U.S. PATENT DOCUMENTS 4,716,978 A * 1/1988 Wales .................... G01G 17/02 177/1
6,213,277 B1 * 4/2001 Blad ........................ G07D 5/04 232/15
9,117,106 B2 * 8/2015 Dedeoglu .............. G06V 20/64
9,235,928 B2 1/2016 Medioni et al.
(Continued)

FOREIGN PATENT DOCUMENTS

DE 102018132059 B4 7/2023
FR 3077261 A1 8/2019

OTHER PUBLICATIONS

PCT/US2025/019377, "International Search Report and Written Opinion", Jul. 3, 2025, 15 pages.

*Primary Examiner* — Thomas D Alunkal
(74) *Attorney, Agent, or Firm* — Kilpatrick Townsend & Stockton LLP

(57) ABSTRACT

Systems and methods for automatically taring mobile produce scales include receiving sensor data indicating a weight change event associated with a weight sensor, and generating a tare request. In response to the tare request, a difference in weight data associated with the weight sensor before and after the weight change event may be determined. Stability data associated with the weight sensor may also be used to determine whether to automatically tare the weight sensor. If the difference between the weight data is within a threshold associated with the weight change event, the weight sensor may be automatically tared. If the difference between the weight data exceeds the threshold associated with the weight change event, the weight sensor will not be automatically tared. The weight sensor may then be re-tared manually.

20 Claims, 8 Drawing Sheets

(56) References Cited

U.S. PATENT DOCUMENTS

| | | | | |
|---|---|---|---|---|
| 9,473,747 | B2 * | 10/2016 | Kobres | G06Q 30/00 |
| 10,677,637 | B1 * | 6/2020 | Von Muenster | A01D 41/1272 |
| 11,953,369 | B2 * | 4/2024 | Bai | G01G 23/44 |
| 2002/0079367 | A1 * | 6/2002 | Montani | G07G 3/006 235/383 |
| 2008/0005036 | A1 * | 1/2008 | Morris | G01G 23/3735 705/64 |
| 2009/0063176 | A1 * | 3/2009 | French | G06Q 10/087 705/21 |
| 2013/0284806 | A1 * | 10/2013 | Margalit | G07G 1/0009 235/382 |
| 2014/0338987 | A1 * | 11/2014 | Kobres | G01G 19/4144 177/1 |
| 2018/0158056 | A1 * | 6/2018 | Williams | G06Q 20/208 |
| 2019/0154492 | A1 * | 5/2019 | McNeally | G01G 19/4144 |
| 2020/0018636 | A1 * | 1/2020 | Avramovich | A61G 7/0527 |
| 2021/0156727 | A1 * | 5/2021 | Bai | G01G 23/14 |
| 2021/0381150 | A1 * | 12/2021 | Hombroek | D06F 33/36 |
| 2022/0277256 | A1 * | 9/2022 | Mellon | G06Q 10/087 |

* cited by examiner

MULTI-SENSOR SYSTEM FOR AUTOMATICALLY TARING MOBILE PRODUCE SCALES

BACKGROUND

Traditional physical stores maintain an inventory of items in customer-accessible areas such that customers can pick items from the inventory, and take them to a point-of-sale device in order to process a transaction (e.g., purchase items, rent items, etc.). Devices, including point-of-sale devices, have become available to improve the retail shopping experience for customers. Self-checkout stations may be utilized by customers to complete their retail transactions in certain environments without the need for staff assistance. Self-checkout stations, as well as the traditional staffed checkout counters, may still require the customer to bring the items they wish to purchase to the checkout stations, unload the items, and input payment information (e.g., credit card information). Such actions may be inconvenient, as well as physically and/or temporally difficult for customers. Additionally, certain items, such as produce items, may be priced based on weight, and may require the use of a weight scale.

BRIEF DESCRIPTION OF THE DRAWINGS

The detailed description is set forth below with reference to the accompanying figures. The use of the same reference numbers in different figures indicates similar or identical items. The systems depicted in the accompanying figures are not to scale and components within the figures may be depicted not to scale with each other.

DETAILED DESCRIPTION

Figure 1:
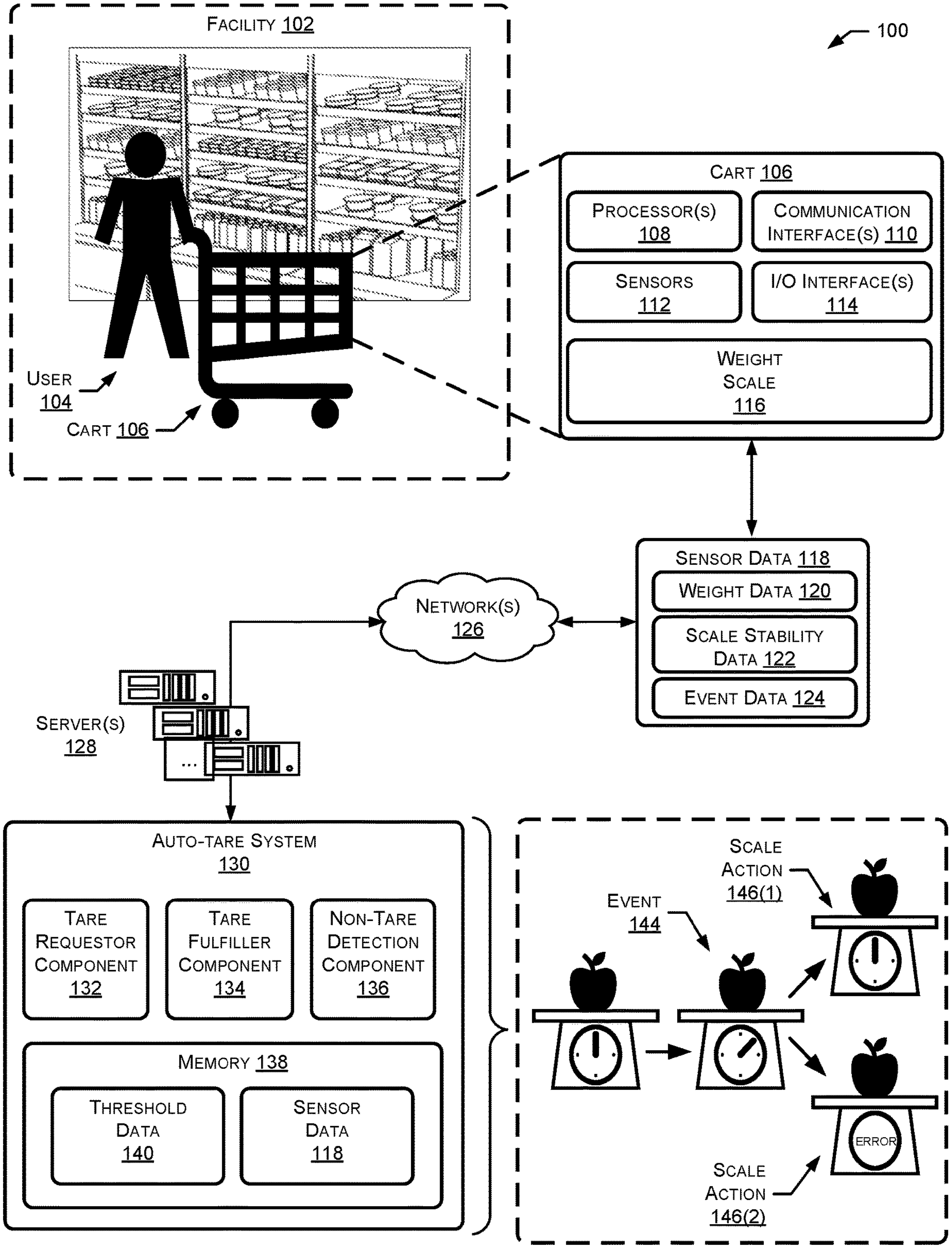
FIG. 1 illustrates a schematic diagram of an illustrative environment for the automatic taring of produce weight scales associated with a cart, according to at least some examples.

The systems and methods described herein are directed towards improving a process for purchasing produce or other sell-by-weight items within a facility by automatically taring a mobile scale to avoid causing a user to remove and re-add items to their shopping basket. For instance, in typical systems and methods for self-checkout, a user may initially be required to indicate an intention to add a produce item and/or select an identity of the item before placing it on the scale. Further, after the user may indicate an intention to add a produce item, the user may have to wait for the scale to tare before placing the item on the scale. The systems and methods described herein provide for indicating the addition of produce or other sell-by-weight items by automatically taring the scale and thereby having an accurate weight for the item.

Traditionally, customers have used staffed checkout counters in order to purchase items from a retailer facility, which may be heavily dependent on staff availability on a one-to-one basis. Some retailers have implemented the use of self-checkout stations to limit the need for staff intervention. However, both types of point-of-sale systems may create friction and/or inefficiencies in the customer checkout experience. For example, both systems may require the customer to bring the items they wish to purchase to a designated checkout point, unload the items, bag the items, as well as present a form of payment (e.g., debit card, credit card, checkbook, etc.). In these and other scenarios, a customer may have physical difficulties trying to unload and bag their items, and the sale process may be slowed down due to the time it takes for the customer to locate a form of payment from their personal belongings. Additionally, or alternatively, some items, such as produce, may require the use of a weight scale, which may further complicate the sale process. For example, when produce items are added to a weight scale in the aggregate, customers often may be required to stop and wait for the weight scale to be tared, add the produce item, and wait for the weight scale to read the produce item weight. In order to address these frictions, some retailers may implement systems that automatically check out customers without the need for an interaction with traditional point-of-sale systems. Various detection processes may be used in order to track produce items being placed in a mobile apparatus (e.g., cart, basket, tote, etc.) and/or events associated with the mobile apparatus such that weight scales used by the mobile apparatus can be correctly, and automatically, tared and provide an accurate weight reading for produce items. The produce items may then be added to a user's transaction (hereinafter "virtual cart").

Described herein are, at least in part, techniques including the detection of weight change events associated with a mobile apparatus (i.e., a cart), and the automatic taring of one or more sensors associated with the mobile apparatus (i.e., weight scales, load cells, etc.). The techniques described herein may be applicable in various scenarios, including scenarios when a user of a facility, such as a retail facility, may wish to use a weight scale at a cart in order to purchase produce items without the need to purchase their items at a traditional checkout, self-checkout station, and the like.

Systems and methods for a multi-sensor system for automatically taring (e.g., auto-tare) mobile produce scales are disclosed, among other things. The mobile produce scales may be associated with a mobile apparatus (e.g., cart) in a facility, such as a retail facility. The mobile produce scales may also be associated with an auto-tare system that uses sensor-based detection techniques so that mobile produce scales may be automatically tared in response to a given event. For example, a sensor associated with the mobile apparatus may detect an event, such as a change in movement of a scale, a produce item being placed on the scale and subsequently removed, and/or another type of change associated with the scale that may cause a weight change. When an event is detected, a request to tare the weight scale may be generated. The auto-tare system may validate the request to tare the weight scale based on the detected event and a change in weight associated with the weight scale from before and after the detected event. In some examples, the auto-tare system may refrain from fulfilling the tare request until the weight scale is within a threshold level of stability. If the weight scale is not within the threshold level of stability, and/or the weight changed associated with the weight scale does not correspond to an expected weight change associated with the detected event, then the weight scale may not be automatically tared. Additionally, or alternatively, when the weight change associated with the weight scale does not correspond to an expected weight change associated with the detected event, and in turn the weight scale is not automatically tared, the auto-tare system may be configured to determine whether the weight before the detected event violates a residual weight threshold for weighing produce items. If the weight before the detected event violates the residual weight threshold, then the weight scale may not be automatically tared. In some instances, the weight scale may be disabled so it may be reset and an accurate produce weight may be obtained.

A user, or customer, of a facility may utilize a cart associated with the facility. In some instances, the cart may include one or more sensors, such as cameras that may be configured to capture image data of the contents of the cart and recognize, through computer vision techniques, items that are placed into the cart and/or other events associated with the cart. The one or more sensors may also include accelerometers, motion sensors, and the like. Additionally, or alternatively, the cart may include a weight sensor, or weight scale that may be used to detect when items have been placed into the cart and/or other events associated with the cart. In some examples, the weight scale may be used when produce items are placed in the cart, where the produce items are weighed in order to be added to the user's virtual cart. The cart may also be equipped with, or associated with, a user interface device configured to receive input from the user.

In some examples, the one or more sensors may obtain sensor data. The sensor data may include image data associated with the facility and/or the cart, such as the contents of the cart and/or changes in the contents of the cart. The sensor data may also include weight data associated with the weight scale of the cart, and may indicate a weight change event associated with the cart. For example, the weight change event may indicate that the weight scale has stopped moving (e.g., the user pushing the cart has stopped in order to add an item into the cart). The weight change event may indicate that the user has placed an item on the scale, and subsequently removed the item (e.g., the user changed their mind on a produce item they were planning on purchasing). Additionally, or alternatively, the weight change event may be any other event detected by the one or more sensors that would cause a change in weight of the weight scale (e.g., the cart crashes into another cart or object, causing items in the cart to inadvertently fall on the weight scale). In some examples, the sensor data may also include scale stability data, and indicate a degree of stability associated with the weight scale. Additionally, or alternatively, the sensor data my include user input data, where the user input data indicates a weight change event.

Once the sensor data has been obtained by the one or more sensors associated with the cart, an auto-tare system associated with the facility, cart, and/or weight scale may use this data to determine whether the weight scale should be automatically tared. In some examples, the auto-tare system may be implemented according to a split architecture where a sensor obtains sensor data, while more processes may be performed using a backend, server-based implementation. For example, the auto-tare system may include one or more network-based computing devices positioned at a remote, cloud-based location. In some examples, the cloud-based devices of the auto-tare system may perform various processing techniques on the sensor data such that the auto-tare system is able to perform an appropriate action with respect to a weight scale associated with a cart. In some instances, the auto-tare system may be implemented locally at a cart.

After receiving the sensor data indicating a weight change event, the auto-tare system may generate a tare request. For example, the auto-tare system may be associated with a first subsystem, such as a tare requestor component, that is configured to generate tare requests based on the occurrence of a weight change event associated with the weight scale, where a change in the weight scale reading may occur despite the user of the cart not actively adding a produce item to the cart. For example, the user may be pushing the cart and suddenly come to a stop, where the change in movement of the cart may cause a change in the weight scale reading despite no items being added to the cart. In another example, the user may add a produce item to the weight scale with an intent to later purchase the produce item, but the user may then change their mind and remove the item from the cart. However, the weight scale reading may still be altered. Accordingly, the tare requestor component may receive sensor data indicating a weight change event, where the tare requestor component may be configured to identify the weight change event. Accordingly, when the tare requestor component identifies a weight change event, the tare requestor component may generate a tare request for the weight scale.

Further, the auto-tare system may include a second subsystem, such as a tare fulfiller component configured to execute the tare request and cause the weight scale to be tared based on an explained weight change. In examples where a weight change event is identified by the tare requestor component based on the sensor data, and a tare request generated, the tare fulfiller component may cause the weight scale to be tared based on a variety of factors. For example, the tare fulfiller component may receive an indication of the weight change event from the tare requestor component. In response to the tare request and the indication of the weight change event, the tare fulfiller component may be configured to validate the tare request. For example, the tare fulfiller component may receive, from one or more sensors associated with the cart, sensor data such as weight data. The weight data may indicate the weight associated with the scale before the occurrence of the weight change event, and/or the weight associated with the scale after the occurrence of the weight change event. For example, before the occurrence of the weight change event, such as a change in movement of the cart, the weight scale may have a reading of zero (i.e., the weight scale may have been tared previously). After the weight change event, the weight scale may have a reading of 5 grams despite no new items being added to the cart (e.g., the change in the movement of the cart caused items in the cart to shift).

The tare fulfiller component may compare the change in weight before and after the weight change event, and determine whether the change in weight is within a threshold associated with the weight change event. For example, weight change events may be associated with a threshold weight change of 20 grams. Additionally, or alternatively, different weight change events may be associated with different threshold weight changes. For example, a weight change event where a user added a produce item to the cart, and then removes the item, may have a lower threshold of weight change than the threshold of weight change associated with a change in cart movement. If the weight change of the weight scale before and after the weight change event is within the threshold weight change associated with the weight change event, then the tare fulfiller component may cause the weight scale to be tared. If the weight change of the weight scale before and after the weight change event is not within the threshold weight change associated with the weight change event, then the tare fulfiller component may not fulfill the tare request. Additionally, or alternatively, the tare fulfiller component may not fulfill the tare request until the weight scale reaches a requisite stability level. In some instances, the tare fulfiller component may receive scale stability data from the sensors associated with the cart. If the scale stability data indicates that the weight scale has not reached a requisite stability level, the tare fulfiller component may not fulfill the tare request. If the scale stability data indicates that the weight scale has reached a requisite stability level, the tare fulfiller component may tare the weight scale and fulfill the tare request. Once the weight scale has been automatically tared by the tare fulfiller component, the user may be able to add produce items to the cart, where the produce items may be weighed and added to the user's virtual cart.

In some instances, the tare fulfiller component may not fulfill the tare request due to the weight change of the weight scale before and after the weight change event not being within the threshold weight change associated with the weight change event. The auto-tare system may also be configured to refrain from updating the tare value of the weight sensor, disable the weight scale, reset the weight scale, and/or the like. For example, the auto-tare system may include a third subsystem, such as a non-tare detection component. The non-tare detection component may refrain from auto-taring the weight scale and/or disable the weight scale in response to the weight reading of the weight scale prior to the weight change event exceeds, or violates, a residual weight threshold, such that future readings by the weight scale for produce products to be added to the cart may be inaccurate. In some instances, the non-tare detection component may be configured to continuously and/or periodically determine whether the weight reading of the weight scale prior to the weight change event exceeds, or violates, a residual weight threshold. Additionally, or alternatively, when the tare fulfiller component is unable to fulfill a tare request (i.e., the weight change event is "unexplained"), the non-tare detection component may receive an indication of the unexplained weight change event. In such instances, the weight change event may be unexplained such that the auto-tare system is unable to automatically tare the weight scale. Additionally, or alternatively the non-tare detection component may cause the weight scale to be disabled, reset, and/or the like due to the weight scale not being properly tared. For example, the non-tare detection component may receive weight data from the sensors associated with the cart, where the weight data may include an indication of the weight reading of the weight scale prior to the weight change event. The non-tare detection component may determine that the weight reading of the weight scale prior to the weight change event exceeds, or violates, a residual weight threshold, such that future readings by the weight scale for produce products to be added to the user virtual cart may be inaccurate. If the weight reading of the weight scale prior to the weight change event exceeds the residual weight threshold, then the non-tare detection component may cause the weight scale to be disabled. When the weight scale is unable to be auto-tared, the weight scale may be reset by the user, an associate of the facility, and the like. In some examples, if the weight reading of the weight scale prior to the weight change event is within the residual weight threshold, then the reading of the weight scale may remain unchanged. The user may be able to add produce items to the cart, where the produce items may be weighed and added to the user's virtual cart.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting disclosures. The features illustrated or described in connection with one disclosure may be combined with the features of other disclosures, including as between systems and methods. Such modifications and variations are intended to be included within the scope of the appended claims.

Although the application describes disclosures having specific structural features and/or methodological acts, it is to be understood that the claims are not necessarily limited to the specific features or acts described. Rather, the specific features and acts are merely illustrative some disclosures that fall within the scope of the claims.

Additional details are described below with reference to several example disclosures. While the foregoing disclosure is described with respect to the specific examples, it is to be understood that the scope of the description is not limited to these specific examples. Since other modifications and changes varied to fit particular operating requirements and environments will be apparent to those skilled in the art, the disclosure is not considered limited to the example chosen for purposes of disclosure, and covers all changes and modifications which do not constitute departures from the true spirit and scope of this disclosure. Like numbers refer to like elements throughout.

FIG. 1 illustrates an example environment 100 of a facility 102 that includes a mobile apparatus, such as cart 106 being used and/or pushed by user 104. As FIG. 1 depicts, the user 104 may be engaging in purchasing items from the facility 102 using the cart 106. The cart 106 may include one or more sensors 112, as well as weight scale 116. In this example, the weight scale 116 may be configured to detect when produce items are placed in the cart 106. The sensors 112 may be a camera configured to detect event 144 associated with the cart 106. For example, sensors 112 may capture image data, video data, visual data, and the like, of the contents of the cart 106 and recognize, through computer vision techniques, items that are placed into the cart 106 and/or other events 144 associated with the cart 106. The sensors 112 may also include accelerometers, motion sensors, and the like. The cart 106 may include weight scale 116 that may be used to detect when items have been placed into the cart 106 and/or other events 144 associated with the cart 106 and/or weight scale 116. In some examples, the weight scale 116 may be used when produce items are placed in the cart 106 by the user 104, where the produce items are weighed in order to be added to the user's 104 virtual cart. The cart 106 may also be equipped with, or associated with, a user interface device configured to receive input from the user. For example, the cart 106 may receive input from the user 104 indicating an event 144 that could cause a weight change with the weight scale 116, such as an input made via I/O interface(s) 114 (e.g., touch screen, mouse, keyboard, etc.) of a user interface component presented on a display at the cart 106. The I/O interface(s) 114 may comprise Inter-Integrated Circuit (I2C), Serial Peripheral Interface bus (SPI), Universal Serial Bus (USB) as promulgated by the USB Implementers Forum, RS-232, and so forth. The cart 106 may also include one or more hardware processors 108 configured to executed one or more stored instructions. The processors 108 may comprise one or more cores.

Continuing from the example above, the sensors 112 may obtain sensor data 118, which may indicate an event 144 associated with the cart 106 and/or the weight scale 116 (e.g., event data 124). For example, the event data 124 may indicate that the weight scale 116 has stopped moving (e.g., the user 104 pushing the cart 106 has stopped in order to add an item into the cart 106). The event data 124 may indicate that the user 104 has placed an item on the weight scale 116, and subsequently removed the item (e.g., the user 104 changed their mind on a produce item they were planning on purchasing). Additionally, or alternatively, the event data 124 may indicate any other event 144 detected by the sensors 112 that would cause a change in weight of the weight scale 116 (e.g., the cart 106 crashes into another cart or object, causing items in the cart 106 to inadvertently fall on the weight scale 116). In some examples, the sensor data 118 may also include scale stability data 122, and indicate a degree of stability associated with the weight scale 116.

Once the sensors 112 and/or the weight scale 116 have obtained sensor data 118, the cart 106 may send (e.g., upload, stream, etc.) the sensor data 118 to the server(s) 128 over one or more network(s) 126 using one or more communication interface(s) 110. The network(s) 126 may include private networks such as institutional or personal intranet, public networks such as the Internet, or a combination thereof. The network(s) 126 may be implemented using wired infrastructure or wireless infrastructure (e.g., cellular, microwave, satellite, etc.), or other connection technologies. The communication interface(s) 114 may include devices configured to couple to personal area networks (PANs), wired and wireless local area networks (LANs), wired and wireless wide area networks (WANs), and so forth.

As illustrated, the server(s) 128 may be connected to the cart 106 over one or more network(s) 126. In some examples, the server(s) 128 may be physically present at the facility 102, may be at a remote location accessible by network(s) 126, or a combination of both. Additionally, or alternatively, the server(s) 128 may be associated with an auto-tare system 130 configured to automatically tare the weight scale 116 associated with the cart 106. One or more components of the auto-tare system 130 may store the sensor data 118 in memory 138, such that the sensor data 120 may be used in order to determine whether to automatically tare the weight scale 116.

In some instances, the auto-tare system 130 may receive the sensor data 118, and the auto-tare system 130 may use, or work in conjunction with, the tare requestor component 132 to generate tare requests. For example, the auto-tare system 130 may be associated with a tare requestor component 132 that is configured to generate tare requests based on the event data 124 associated with the weight scale 116, where a change in the weight scale reading may occur despite the user 104 of the cart 106 not actively adding a produce item to the cart 106. Accordingly, the tare requestor component 132 may receive sensor data 118 including the event data 124, where the tare requestor component 132 may be configured to identify the weight change event. In some instances, the tare requestor component 132 may analyze the sensor data 118 in order to identify the weight change event (e.g., a change in movement associated with the weight scale 116, an item being place and/or removed from the weight scale 116, a change in contents of the cart 106, input from user 104 indicating a change with the cart 106, and the like). Accordingly, when the tare requestor component 132 identifies a weight change event, the tare requestor component 132 may generate a tare request for the weight scale 116.

The auto-tare system 130, upon generating a tare request for the weight scale 116, may use, or work in conjunction with, the tare fulfiller component 134 in order to execute the tare request (i.e., scale action 146(1)) based on the weight data 120 indicating an explained weight change that is in accordance with the event 144. In examples where the event 144 is identified by the tare requestor component 132 based on the sensor data 118, and a tare request generated, the tare fulfiller component 134 may cause the weight scale 116 to be tared based on a variety of factors. For example, the tare fulfiller component 134 may receive the tare request and event data 124 indicating the event 144 that caused a weight change associated with the weight scale 116. Based on the event data 124, the tare fulfiller component 134 may be configured to validate the tare request. For example, the tare fulfiller component 134 may receive weight data 120. The weight data 120 may include weight data 120 associated with the weight scale 116 before the event 144. The weight data 120 may also include weight data 120 associated with the weight scale 116 after the event 144. For example, before the occurrence of the event 144, such as a change in movement of the cart 106 causing a change in reading by the weight scale 116, the weight data 120 may indicate a weight scale 116 reading of zero (e.g., the weight scale 116 may have been previously tared or "zeroed out"). After the event 144, the weight scale 116 may have a reading of 5 grams despite no new items being added to the cart 106 (e.g., the change in movement of the cart 106 caused items in the cart 106 to shift, and in turn, cause a change in reading by the weight scale 116.

The one or more components of auto-tare system 130 may also store threshold data 140 in memory 138, such that the threshold data 140 may be used by the tare fulfiller component 134 in determining whether to execute the tare request for weight scale 116. The tare fulfiller component 134 may use the threshold data 140 to determine a comparison between the threshold data 140 and the weight data 120 associated with the weight scale 116 before the event 144 and the weight data 120 associated with the weight scale 116 after the event 144. The threshold data 140 may indicate a standard threshold for all types of events 144. In some instances, each type of event 144 may be associated with certain threshold (e.g., some events 144 may be associated with a greater change in weight than other events 144). For example, an event 144 where the user 104 adds a produce item to the cart 106, and then removes the item, may have a lower threshold of weight change than the threshold of weight change associated with a change in cart 106 movement. For example, the event 144 may be associated with a threshold of 20 grams, such that when the weight data 120 indicates a change in weight after the event 144 that is within the threshold of 20 grams, the tare fulfiller component 134 may execute the tare request and cause the weight scale 116 to be tared (i.e., tare action 146(1))

Additionally, or alternatively, the auto-tare system 130 may be configured to use scale stability data 122 from the weight scale 116 and/or sensors 112 in determining whether to fulfill the tare request. The auto-tare system 130 may use, or work in conjunction with, the tare fulfiller component 134 to use the scale stability data 122 in order to determine whether to fulfill the tare request. For example, the tare fulfiller component 134 may receive scale stability data 122 associated with the weight scale 116 at the cart 106. The scale stability data 122 may indicate that the weight scale 116 has not reached a requisite stability level (e.g., the weight scale 116 is still moving such that the weight data 120 associated with the weight scale 116 may not be accurate). For example, the requisite stability level may be based on compliance with applicable regulations and laws. For example, standards set forth by the National Type Evaluation Program ("NTEP") of the U.S. National Council on Weights and Measures, the International Organization of Legal Metrology ("OIML"), and/or the like. Additionally, or alternatively, the scale stability data 122 may indicate that the weight scale 116 has reached the requisite stability level (e.g., the weight scale 116 is still such that the weight data 120 associated with the weight scale 116 is likely to be accurate). Based on the scale stability data 122, the tare fulfiller component 134 may fulfill the tare request and execute scale action 146(1). Upon scale action 146(1), where the weight scale 116 may be caused to be tared by the tare fulfiller component 134, the user 104 may then be able to add, or aggregate, additional produce items into the cart 106, where the produce items may be weighed by the weight scale 116 and added to the user's 104 virtual cart.

In some instances, the auto-tare system 130 may be configured to use, or work in combination with, the non-tare detection component 136 in order to perform scale action 146(2), such as refraining from auto-taring the weight scale 116 and/or causing the weight scale 116 to be disabled in some circumstances. Additionally, or alternatively, the non-tare detection component 136 may be configured to continuously and/or periodically determine whether the weight reading of the weight scale 116 prior to the event 144 exceeds, or violates, a residual weight threshold. In some instances, the non-tare detection component 136 may disable the weight scale 116 after the tare fulfiller component 134 is unable to cause scale action 146(1) to be executed (i.e., unable to fulfill the tare request) due to an unexplained event 144 (e.g., the difference between weight data 120 before an event 144 and weight data 120 after the event 144 does not correspond to a threshold weight change associated with an event 144). Additionally, or alternatively, non-tare detection component 136 may receive an indication of the unexplained event 144, where the tare fulfiller component 134 was unable to automatically cause the weight scale 116 to tare. In some instances, based on threshold data 140, the non-tare detection component 136 may cause scale action 146(2) to occur, such as causing the weight scale 116 to be disabled. For example, the threshold data 140 may include an indication of a residual weight threshold, where the residual weight threshold may indicate a threshold weight prior to the event 144 such that future weight readings of produce items by the weight scale 116 may be accurate or inaccurate. The tare detection component 136 may use the threshold data 140 indicating the residual weight threshold and weight data 120 indicating the weight reading of the weight scale 116 before the event 144 to determine whether the weight reading of the weight scale 116 before the event 144 violates the residual weight threshold. If the weight reading of the weight scale 116 before the event 144 violates the residual weight threshold (e.g., exceeds the threshold), the tare detection component 136 may cause the scale action 146(2) to be performed, such as disabling the weight scale 116 until it may be re-tared. In some instances, such as when the weight scale 116 is unable to be auto-tared, the weight scale 116 may be re-tared by the user 104, an associate of the facility 102, and the like. In some examples, if the weight reading of the weight scale 116 prior to the event 144 is within the residual weight threshold, then the reading of the weight scale 116 may remain unchanged. The user 104 may be able to add produce items to the cart 106, where the produce items may be weighed and added to the user's 104 virtual cart.

Figure 2:
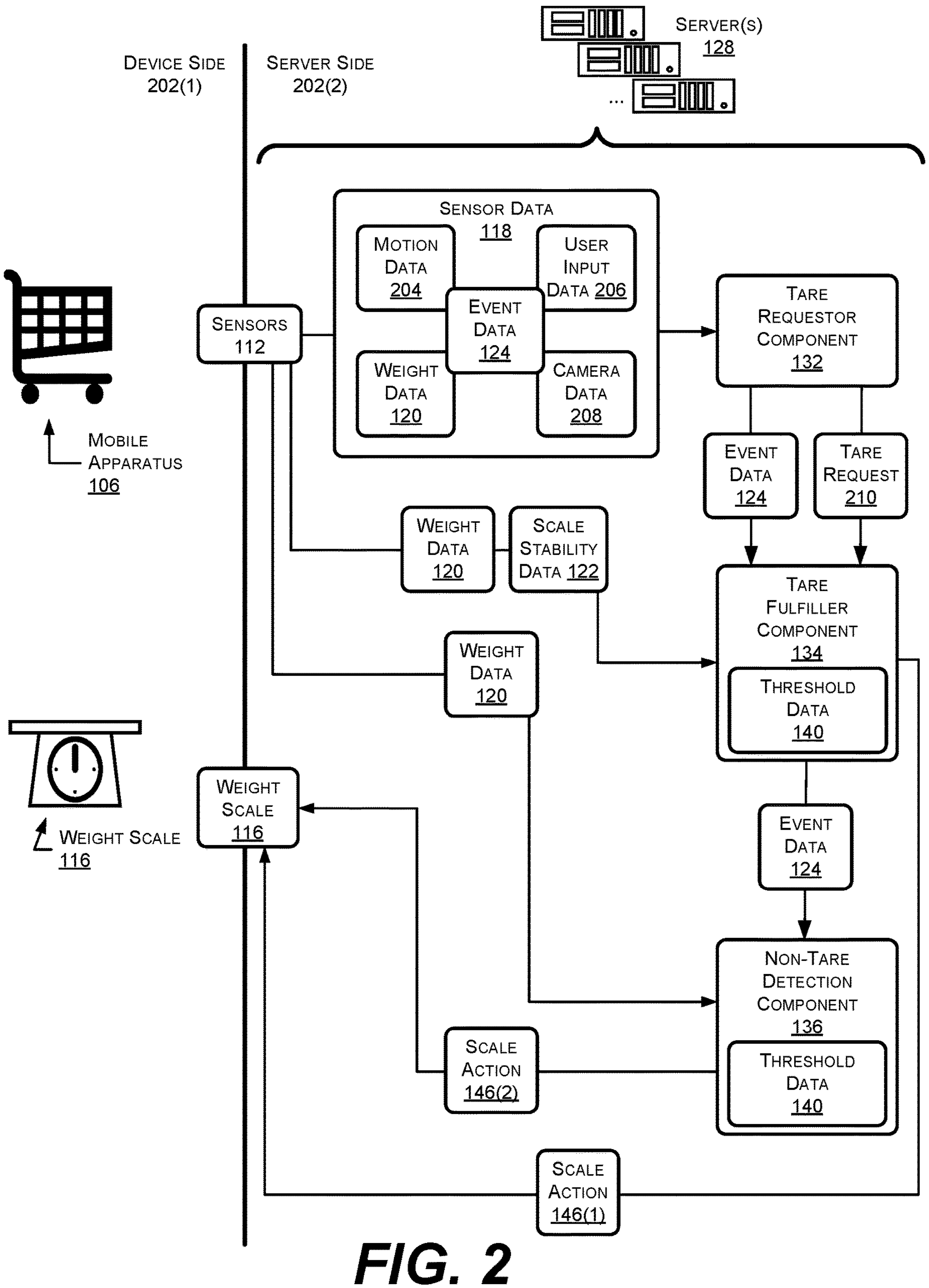
FIG. 2 illustrates example components of the system of FIG. 1 that performs an example of processing sensor data to automatically tare a produce weight scale associated with a cart and/or identify an action to perform with respect to the produce weight scale, according to at least some examples.

FIG. 2 illustrates example components of the system of FIG. 1 that performs an example of processing sensor data to automatically tare a produce weight scale associated with a cart and/or identify an action to perform with respect to the produce weight scale. As illustrated, FIG. 2 is split into a device-side 202(1), corresponding to the cart 106 and/or weight scale 116 associated with the facility 102, and a server side 202(2), corresponding to the auto-tare system 130. Other devices and/or systems may be substituted for the illustrated devices and/or systems or added to the device side 202(1) and/or server side 202(2).

As illustrated, the cart 106 may be associated with one or more sensors 112 configured to generate sensor data 118, including, but not limited to, motion data 204, user input data 206, weight data 120, event data 124, and/or camera data 208. The sensors 112 may transmit the sensor data 118 from the device side 202(1) to the server(s) 128 on the server side 202(2), which may be received by the tare requestor component 132 associated with the auto-tare system 130. The tare requestor component 132 may use the sensor data 118 to generate a tare request 210. For example, the tare requestor component 132 may receive motion data 204 indicating that a change in motion associated with the cart 106 has occurred (e.g., the cart 106 stopped moving, began to move, was hit by another cart, etc.) Additionally, or alternatively, the tare requestor component 132 may receive camera data 208, where the camera data 208 indicates an event occurred within the cart 106 (e.g., an item was added to the cart 106, removed from the cart 106, and the like). Additionally, or alternatively, the tare requestor component 132 may receive user input data 206, where the user input data 206 may indicate a change in contents of the cart 106. The tare requestor component 132 may receive any other type of event data 124 from the sensors 112, indicating that an event associated with the cart 106 occurred that could cause a change in the weight reading of the weight scale 116. Based on the sensor data 118, the tare requestor component 132 may determine that an event occurred, and send a tare request 210 to the tare fulfiller component along with the event data 124.

The tare fulfiller component 134 may receive the tare request 210 and the event data 124, and the tare fulfiller component 134 may validate the tare request 210 based on the event data 124, weight data 120, and/or scale stability data 122. For example, the tare fulfiller component 134 may receive weight data 120 from sensors 112 associated with the cart 106. The weight data 120 may include the weight associated with the weight scale 116 before an event occurred and the weight associated with the weight scale 116 after the event occurred. The tare fulfiller component 134 may determine a comparison (or weight change) between the weight associated with the weight scale 116 before the event occurred and the weight associated with the weight scale 116 after the event occurred. The tare fulfiller component 134 may then determine, using threshold data 140, whether the weight change violates a threshold associated with the event. In other words, the event may be associated with an expected change in weight. If the weight change does not violate the threshold associated with the event as indicated by the threshold data 140 (e.g., the weight change is within the threshold expected change in weight), then the tare fulfiller component 134 may cause the weight scale 116 to be automatically tared (i.e., scale action 146(1)). If the weight change does not violate the threshold associated with the event as indicated by the threshold data 140, then the tare fulfiller component 134 may refrain from causing the weight scale 116 to be automatically tared. Additionally, or alternatively, the tare fulfiller component 134 may receive, from the sensors 112, scale stability data 122. The scale stability data 122 may indicate a stability level associated with the weight scale 116 (e.g., if the scale is still moving or not). The tare fulfiller component 134 may also use the scale stability data 122 to determine whether to cause the weight scale 116 to be automatically tared or not. The tare fulfiller component 134 may also use the scale stability data 122 in conjunction with threshold data 140, where the threshold data 140 may indicate a requisite stability level for the weight scale 116. For example, if the scale stability data 122 indicates that the weight scale 116 is still moving, the tare fulfiller component 134 may refrain from causing the weight scale 116 from automatically taring. Additionally, or alternatively, if the scale stability data 122 indicates that the weight scale 116 is within a requisite stability level, the tare fulfiller component 134 may proceed with using weight data 120 and threshold data 140 to determine whether to cause the weight scale 116 to be automatically tared.

In instances where the tare fulfiller component 134 may refrain from causing the weight scale 116 to be automatically tared, the non-tare detection component 136 may receive the event data 124 from the tare fulfiller component 134, where the event is "unexplained" and thus the tare fulfiller component 134 did not cause the weight scale 116 to be automatically tared (i.e., scale action 146(1)). Additionally, or alternatively, the non-tare detection component 136 may be configured to continuously and/or periodically determine whether the weight reading of the weight scale 116 prior to a weight change event exceeds, or violates, a residual weight threshold indicated by threshold data 140. The non-tare detection component 136 may also receive weight data 120, where the weight data 120 indicates the weight associated with the weight scale 116 before the event indicated by the event data 124. The non-tare detection component 136 may also use threshold data 140, where the threshold data indicates a residual weight threshold. If the weight data 120 indicates a weight before the event that violates the residual weight threshold, the non-tare detection component 136 may cause scale action 146(2) to be performed (e.g., the non-tare detection component 136 cause the weight scale 116). For example, if the weight before the event violates the residual weight threshold, subsequent weigh readings of produce items by the weight scale 116 may be inaccurate. As such, the weight scale 116 may be disabled, reset, and/or the like such that it may be re-tared.

Figure 3:
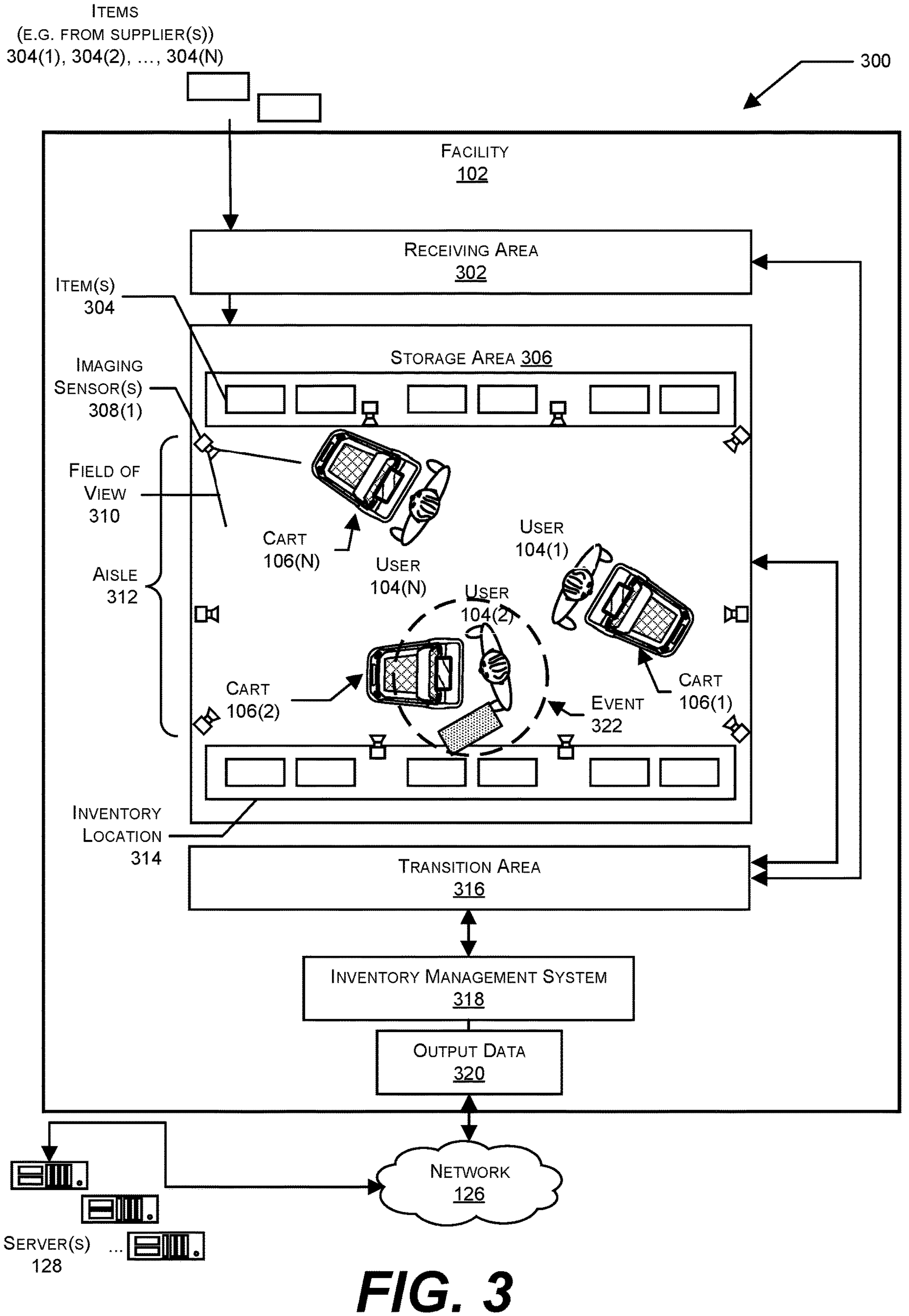
FIG. 3 illustrates an example materials handling facility in which the described techniques may be implemented, according to at least some examples.

FIG. 3 illustrates an example environment 300 with a materials handling facility in which the described techniques may be implemented. However, the following description is merely one illustrative example of an industry and environment in which the techniques described herein may be utilized.

The materials handling facility 102 (or "facility") comprises one or more physical structures or areas within which one or more items 304(1), 304(2), . . . , 304(N) (generally denoted as 1104) may be held. As used in this disclosure, letters in parenthesis such as "(N)" indicate an integer result. The items 304 comprise physical goods, such as books, pharmaceuticals, repair parts, electronic gear, groceries, and so forth.

The facility 102 may include one or more areas designated for different functions with regard to inventory handling. In this illustration, the facility 102 includes a receiving area 302, a storage area 306, and a transition area 316. The receiving area 302 may be configured to accept items 304, such as from suppliers, for intake into the facility 102. For example, the receiving area 302 may include a loading dock at which trucks or other freight conveyances unload the items 304.

The storage area 306 is configured to store the items 304. The storage area 306 may be arranged in various physical configurations. In one implementation, the storage area 306 may include one or more aisles 312. An aisle 312 may be configured with, or defined by, inventory locations 314 on one or both sides of the aisle 312. The inventory locations 314 may include one or more of shelves, racks, cases, cabinets, bins, floor locations, or other suitable storage mechanisms for holding or storing the items 304. The inventory locations 314 may be affixed to the floor or another portion of the facility's structure, or may be movable such that the arrangements of aisles 312 may be reconfigurable. In some implementations, the inventory locations 314 may be configured to move independently of an outside operator. For example, the inventory locations 314 may comprise a rack with a power source and a motor, operable by a computing device to allow the rack to move from one location within the facility 102 to another.

One or more users 104(1), 104(2), . . . , 104(U), carts 106(1), 106(2), . . . , 106(T) (generally denoted as 104 and 106, respectively) or other material handling apparatus may move within the facility 102. For example, the users 104 may move about within the facility 102 to pick or place the items 304 in various inventory locations 314, placing them on carts 106 for case of transport. An individual cart 106 is configured to carry or otherwise transport one or more items 304. For example, a cart 106 may include a basket, a cart, a bag, and so forth.

In other implementations, other agencies such as robots, forklifts, cranes, aerial drones, and so forth, may move about the facility 102 picking, placing, or otherwise moving the items 304.

One or more sensors 308 may be configured to acquire information in the facility 102. The sensors 308 in the facility 102 may include sensors fixed in the environment (e.g., ceiling-mounted cameras) or otherwise, such as sensors in the possession of users (e.g., mobile phones, tablets, etc.). The sensors 308 may include, but are not limited to, cameras 308(1), weight sensors, radio frequency (RF) receivers, temperature sensors, humidity sensors, vibration sensors, and so forth. The sensors 308 may be stationary or mobile, relative to the facility 102. For example, the inventory locations 314 may contain cameras 308(1) configured to acquire images of pick or placement of items 304 on shelves, of the users 104(1) and 104(2) in the facility 102, and so forth. In another example, the floor of the facility 102 may include weight sensors configured to determine a weight of the users 104 or other object thereupon.

During operation of the facility 102, the sensors 308 may be configured to provide information suitable for tracking how objects move or other occurrences within the facility 102. For example, a series of images acquired by a camera 308(1) may indicate removal of an item 304 from a particular inventory location 314 by one of the users 104 and placement of the item 304 on or at least partially within one of the carts 106. Images may also be analyzed as described above to determine locations of products within the facility 102 and to update a facility planogram to indicate the locations.

While the storage area 306 is depicted as having one or more aisles 312, inventory locations 314 storing the items 304, sensors 308, and so forth, it is understood that the receiving area 302, the transition area 316, or other areas of the facility 102 may be similarly equipped. Furthermore, the arrangement of the various areas within the facility 102 is depicted functionally rather than schematically. For example, multiple different receiving areas 302, storage areas 306, and transition areas 316 may be interspersed rather than segregated in the facility 102.

The facility 102 may include, or be coupled to, an inventory management system 318. The inventory management system 318 may maintain a virtual cart of each user 104 within the facility 102. The inventory management system 318 may also store an identifier corresponding to an account of each user 104, the location of each of these identifiers, and whether the user 104 is eligible to exit the facility 102 with one or more items 304 without performing a manual checkout of the items 304. The inventory management system 318 may also generate and output notification data to the users 104, indicating whether or not they are so eligible. It is to be appreciated that the system may locate the identifier within the facility 102, but that this identifier may be free from information of an identity of a user. That is, the system may locate identifiers associated with accounts, rather than locate identified users within the facility.

As illustrated, the inventory management system 318 may reside at the facility 102 (e.g., as part of on-premises servers), on the servers 128 that are remote from the facility 102, a combination thereof. In each instance, the inventory management system 318 is configured to identify interactions and events with and between users 104, devices such as sensors 308, robots, material handling equipment, computing devices, and so forth, in one or more of the receiving area 302, the storage area 306, or the transition area 316. As described above, some interactions may further indicate the existence of one or more events 322—or predefined activities of interest. For example, the events 322 may include the entry of the user 104 to the facility 102, stocking of items 304 at an inventory location 314, picking of an item 304 from an inventory location 314, returning of an item 304 to an inventory location 314, placement of an item 304 within a cart 106, movement of users 104 relative to one another, gestures by the users 104, and so forth. Other events 322 involving users 104 may include the user 104 providing authentication information in the facility 102, using a computing device at the facility 102 to authenticate identity to the inventory management system 318, and so forth. Some events 322 may involve one or more other objects within the facility 102. For example, the event 322 may comprise movement within the facility 102 of an inventory location 314, such as a counter mounted on wheels. Events 322 may involve one or more of the sensors 308. For example, a change in operation of a sensor 308, such as a sensor failure, change in alignment, and so forth, may be designated as an event 322. Continuing the example, movement of a camera 308(1) resulting in a change in the orientation of the field of view 310 (such as resulting from someone or something bumping the camera 308(1)) may be designated as an event 322.

As described herein, the inventory management system 318 may also analyze images captured within the facility 102 to determine locations of products within the facility 102. In some cases, this analysis may be performed in response to detected changes within the facility, such as inventory locations 314 being moved and/or items 304 being moved.

By determining the occurrence of one or more of the events 322, the inventory management system 318 may generate output data 320. The output data 320 comprises information about the event 322. For example, where the event 322 comprises an item 304 being removed from an inventory location 314, the output data 320 may comprise an item identifier indicative of the particular item 304 that was removed from the inventory location 314 and a user identifier of a user that removed the item. Output data may also include planogram data, such as coordinates of product volumes within the facility 102.

The inventory management system 318 may use one or more automated systems to generate the output data 320. For example, an artificial neural network, one or more classifiers, or other automated machine learning techniques may be used to process the sensor data from the one or more sensors 308 to generate output data 320. For example, the inventory management system may perform techniques for generating and utilizing a classifier for identifying user activity in image data. The automated systems may operate using probabilistic or non-probabilistic techniques. For example, the automated systems may use a Bayesian network. In another example, the automated systems may use support vector machines to generate the output data 320 or the tentative results. The automated systems may generate confidence level data that provides information indicative of the accuracy or confidence that the output data 320 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 304, user 104, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 104 may pick an item 304(1) such as a perfume bottle that is generally cubical in shape from the inventory location 314. Other items 304 at nearby inventory locations 314 may be predominately spherical. Based on the difference in shape (cube vs. sphere) from the adjacent items, and the correspondence in shape with the previously stored image of the perfume bottle item 304(1) (cubical and cubical), the confidence level that the user 104 has picked up the perfume bottle item 304(1) is high.

In some situations, the automated techniques may be unable to generate output data 320 with a confidence level above a threshold result. For example, the automated techniques may be unable to distinguish which user 104 in a crowd of users 104 has picked up the item 304 from the inventory location 314. In other situations, it may be desirable to provide human confirmation of the event 322 or of the accuracy of the output data 320. For example, some items 304 may be deemed age restricted such that they are to be handled only by users 104 above a minimum age threshold.

In instances where human confirmation is desired, sensor data associated with an event 322 may be processed to generate inquiry data. The inquiry data may include a subset of the sensor data associated with the event 322. The inquiry data may also include one or more of one or more tentative results as determined by the automated techniques, or supplemental data. The subset of the sensor data may be determined using information about the one or more sensors 308. For example, camera data such as the location of the camera 308(1) within the facility 102, the orientation of the camera 308(1), and a field of view 310 of the camera 308(1) may be used to determine if a particular location within the facility 102 is within the field of view 310. The subset of the sensor data may include images that may show the inventory location 314 or that the item 304 was stowed. The subset of the sensor data may also omit images from other cameras 308(1) that did not have that inventory location 314 in the field of view 310. The field of view 310 may comprise a portion of the scene in the facility 102 that the sensor 308 is able to generate sensor data about.

Continuing the example, the subset of the sensor data may comprise a video clip acquired by one or more cameras 308(1) having a field of view 310 that includes the item 304. The tentative results may comprise the "best guess" as to which items 304 may have been involved in the event 322. For example, the tentative results may comprise results determined by the automated system that have a confidence level above a minimum threshold.

The facility 102 may be configured to receive different kinds of items 304 from various suppliers and to store them until a customer orders or retrieves one or more of the items 304. Specifically, the items 304 may be received from one or more suppliers, such as manufacturers, distributors, wholesalers, and so forth, at the receiving area 302. In various implementations, the items 304 may include merchandise, commodities, perishables, or any suitable type of item 304, depending on the nature of the enterprise that operates the facility 102. The receiving of the items 304 may comprise one or more events 322 for which the inventory management system 318 may generate output data 320.

Upon being received from a supplier at receiving area 302, the items 304 may be prepared for storage. For example, items 304 may be unpacked or otherwise rearranged. The inventory management system 318 may include one or more software applications executing on a computer system to provide inventory management functions based on the events 322 associated with the unpacking or rearrangement. These inventory management functions may include maintaining information indicative of the type, quantity, condition, cost, location, weight, or any other suitable parameters with respect to the items 304. The items 304 may be stocked, managed, or dispensed in terms of countable, individual units or multiples, such as packages, cartons, crates, pallets, or other suitable aggregations. Alternatively, some items 304, such as bulk products, commodities, and so forth, may be stored in continuous or arbitrarily divisible amounts that may not be inherently organized into countable units. Such items 304 may be managed in terms of measurable quantity such as units of length, area, volume, weight, time, duration, or other dimensional properties characterized by units of measurement. Generally speaking, a quantity of an item 304 may refer to either a countable number of individual or aggregate units of an item 304 or a measurable amount of an item 304, as appropriate.

After arriving through the receiving area 302, items 304 may be stored within the storage area 306. In some implementations, like items 304 may be stored or displayed together in the inventory locations 314 such as in bins, on shelves, hanging from pegboards, and so forth. In this implementation, all items 304 of a given kind are stored in one inventory location 314. In other implementations, like items 304 may be stored in different inventory locations 314. For example, to optimize retrieval of certain items 304 having frequent turnover within a large physical facility 102, those items 304 may be stored in several different inventory locations 314 to reduce congestion that might occur at a single inventory location 314. Storage of the items 304 and their respective inventory locations 314 may comprise one or more event 322.

When a customer order specifying one or more items 304 is received, or as a user 104 progresses through the facility 102, the corresponding items 304 may be selected or "picked" from the inventory locations 314 containing those items 304. In various implementations, item picking may range from manual to completely automated picking. For example, in one implementation, a user 104 may have a list of items 304 they desire and may progress through the facility 102 picking items 304 from inventory locations 314 within the storage area 306, and placing those items 304 into a cart 106. In other implementations, employees of the facility 102 may pick items 304 using written or electronic pick lists derived from customer orders. These picked items 304 may be placed into the cart 106 as the employee progresses through the facility 102. Picking may comprise one or more events 322, such as the user 104 in moving to the inventory location 314, retrieval of the item 304 from the inventory location 314, and so forth.

After items 304 have been picked, they may be processed at a transition area 316. The transition area 316 may be any designated area within the facility 102 where items 304 are transitioned from one location to another or from one entity to another. For example, the transition area 316 may be a packing station within the facility 102. When the item 304 arrives at the transition area 316, the items 304 may be transitioned from the storage area 306 to the packing station. The transitioning may comprise one or more events 322. Information about the transition may be maintained by the inventory management system 318 using the output data 320 associated with those events 322.

In another example, if the items 304 are departing the facility 102 a list of the items 304 may be obtained and used by the inventory management system 318 to transition responsibility for, or custody of, the items 304 from the facility 102 to another entity. For example, a carrier may accept the items 304 for transport with that carrier accepting responsibility for the items 304 indicated in the list. In another example, a customer may purchase or rent the items 304 and remove the items 304 from the facility 102. The purchase or rental may comprise one or more events 322.

The inventory management system 318 may access or generate sensor data about the facility 102 and the contents therein including the items 304, the users 104, the carts 106, and so forth. The sensor data may be acquired by one or more of the sensors 308, data provided by other systems, and so forth. For example, the sensors 308 may include cameras 308(1) configured to acquire image data of scenes in the facility 102. The image data may comprise still images, video, or a combination thereof. The image data may be processed by the inventory management system 318 to determine a location of the user 104, the cart 106, and so forth.

The inventory management system 318, or systems coupled thereto, may be configured to determine an account identifier corresponding to the user 104 to distinguish the user 104 from other users located in the environment based on these respective account identifiers. In some cases, for example, the inventory management system 318 may detect that a person is entering the facility and may assign a unique identifier to that person such that the identifier is located within the facility. This identifier may be associated to that person based on information provided by the person in some instances. Again, it is to be appreciated that this identifier may be generic and free from information outwardly identifying the person, and that this identifier may be located within the facility rather than information identifying the person.

In some instances, the inventory management system may group users within the facility into respective sessions. That is, the inventory management system 318 may utilize the sensor data to determine groups of users that are effectively "together" (e.g., shopping together). In some instances, a particular session may include multiple users that entered the facility 102 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her cart 106. Noting the child and the mother as belonging to the same session may increase the chances of successfully adding the box of cereal to the virtual shopping cart of the mother.

By determining the occurrence of one or more events 322 and the output data 320 associated therewith, the inventory management system 318 is able to provide one or more services to the users 104 of the facility 102. By utilizing one or more human associates to process inquiry data and generate response data that may then be used to produce output data 320, overall accuracy of the system may be enhanced. The enhanced accuracy may improve the user experience of the one or more users 104 of the facility 102. In some examples, the output data 320 may be transmitted over a network 126 to one or more servers 128.

Figure 4:
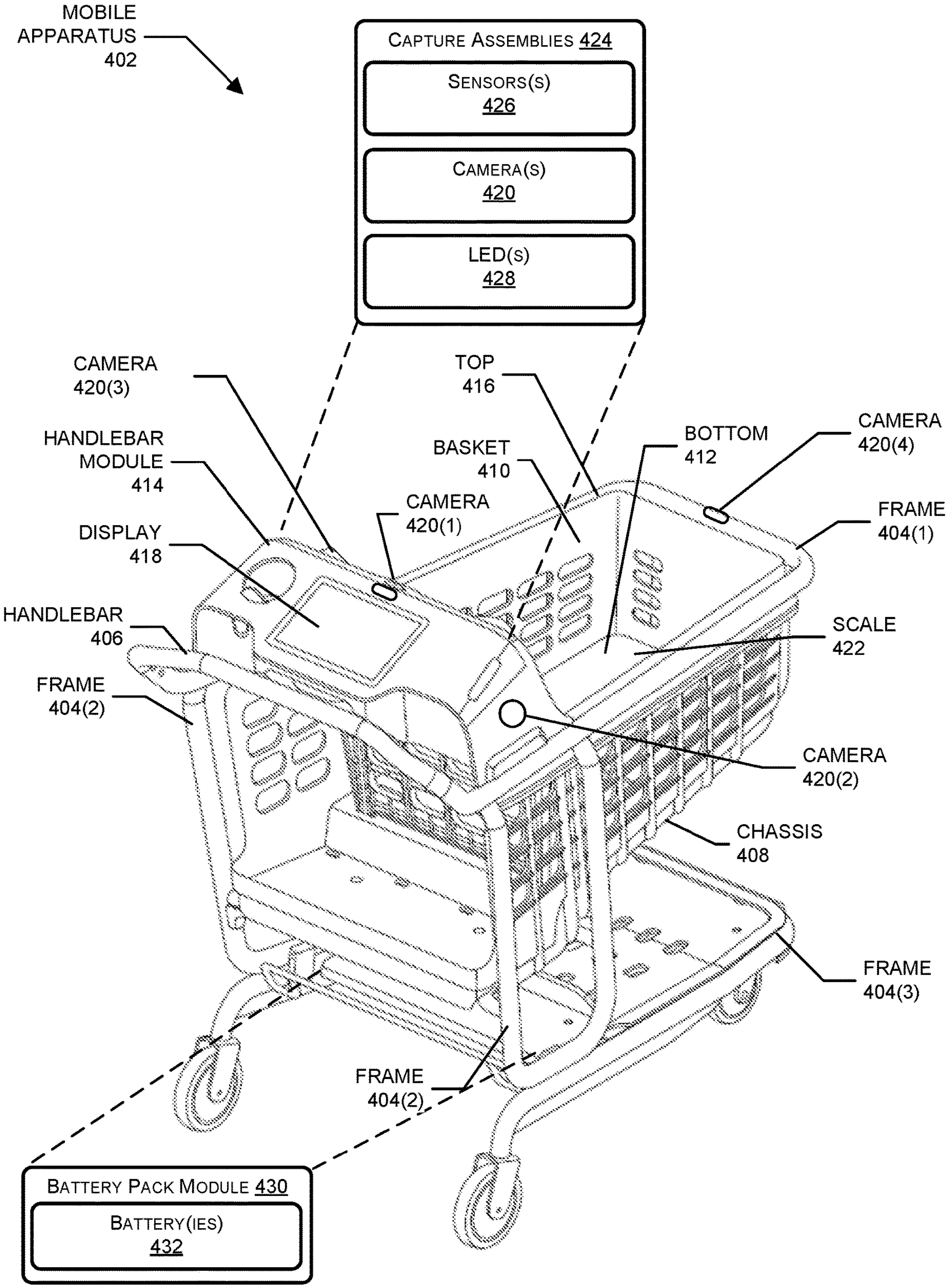
FIG. 4 illustrates an example mobile apparatus for identifying items, according to at least some examples.

FIG. 4 illustrates an example of a mobile apparatus 402 for identifying items, in accordance with examples of the present disclosure. The mobile apparatus 402 may include a main frame 404(1)-(3) (also referred to as a "main frame 404"). As shown, the main frame 404 may include at least a top portion 404(1), side portions 404(2), and a bottom portion 404(3). The top portion of the main frame 404(1) may also include a handlebar 406 that a user uses to push the mobile apparatus 402. The main frame 404 may be made of plastic, wood, metal, composites, or any other material and/or combinations of materials. As shown, the main frame 404 may include, and/or support, the other components of the mobile apparatus 402.

For example, the main frame 404 (e.g., the bottom portion 404(4)) may support a chassis 408. The chassis 408 may include any shape, such as an "X" shape, a square, a circle, a triangle, and/or the like, and support one or more sensors of the mobile apparatus 402. For example, the chassis 408 may include the "X" shape that supports a weight sensor, where a first loadcell of the weight sensor is disposed proximate to a first end of the chassis, a second loadcell of the weight sensor is disposed proximate to a second end of the chassis, a third loadcell of the weight sensor is disposed proximate to a third end of the chassis, and a fourth loadcell of the weight sensor is disposed proximate to a fourth end of the chassis. While this example describes the weight sensor as including four loadcells, in other examples, the chassis 408 may include any number of loadcells. Additionally, the chassis 408 may be made of plastic, wood, metal, composites, or any other material and/or combinations of materials.

The chassis 408 may further include, and/or support, a basket 410. The basket 410 may comprise a bottom 412 having a given shape (e.g., a quadrilateral shape, a circular shape, a triangular shape, etc.), sides protruding from the bottom 412 to define a receptacle, and a top 416 having a perimeter that defines an opening of the receptacle to receive items that are placed within the basket 410. The sides of the basket 410 (as well as a gate described below) include a ribbed pattern. As shown, the ribbed pattern may include openings that are rectangular in shape, but with circular ends. However, in other examples, the openings may include any other shape. The sides of the basket further include protrusions that extend from the bottom 412 of the basket 410 to the top 416 of the basket 410 and/or laterally along the sides of the basket 410.

The mobile apparatus 402 may further include a handlebar module 414 that is coupled to the main frame 404. The handlebar module 414 may include an opening for receiving a removable battery that provides power to the electrical components of the mobile apparatus 402. The handlebar module 414 may include one or more capture assemblies 424 that each include one or more sensor(s) 426, camera(s) 420, and one or more LEDs 428. In some examples, the sensor(s) 426 may comprise any type of sensor that is able to detect the presence of nearby objects without the need for physical contact (e.g., radar, ToF sensor(s), PIR sensor(s), capacitive sensor(s), etc.). The sensor(s) 426 may be positioned to face towards and/or into the basket 410 and may also be directed to a region adjacent to the mobile apparatus 402. The sensor(s) 426 may include a radar device directed towards the basket 410 to detect the presence of new items and trigger one or more additional sensors such as the camera(s) 420 to capture data only when triggered. In this manner, the system may save power and energy to conserve power throughout a service period.

The cameras 420 in each of the capture assemblies 424 may comprise any type of camera or imaging device configured to generate image data (and/or video data), or information descriptive of a plurality of picture elements or pixels. The LED(s) 428 may be selectively activated to emit light at any wavelength, visible or non-visible to users. In some examples, one or more capture assemblies 424 may additionally, or alternatively, be facing downward into the basket 410 of the handlebar module 414. Additionally, the handlebar module 414 may include one or more cameras 420 that are outward facing in that generate image data representing the facility around the handlebar module 414.

By way of example, the mobile apparatus 402 may include an upward facing camera 420 to view markers or indicators on a ceiling of a facility to determine a location of the mobile apparatus 402 within the facility based on visible markers, side facing camera(s) 420 pointed outward from the sides of the mobile apparatus 402, a front facing camera 420, and other such cameras. The cameras may be used to capture image data of the surrounding environment, as described herein, such as to identify empty inventory locations and/or to identify locations or incidents via the mobile apparatus 402. Additionally, or alternatively, the cameras may be used to capture image data inside the mobile apparatus 402, such as image data associated with a weight change event.

The mobile apparatus 402 may also include the display 418 configured to display content represented by image data, such as pictures, videos, user interface elements, and/or any other image data. The display 418 may comprise any type of display 418, and may further be a touch screen to receive touch input from a user. A button or interface of the display 418 may enable a user to report a weight change event associated with the mobile apparatus 402. The mobile apparatus 402 may also include one or more input/output devices (I/O devices) such as scale 422, microphones, loudspeakers, and/or the like the facilitate input and output with a user, and/or to receive feedback from the user. In some instances, the display 418 may present customed information to a user upon identifying the user, such as a shopping list of the user and/or the like. The mobile apparatus 402 may also include other types of sensor(s). As described herein, these sensor(s) may be proximity sensor(s), light sensor(s), weight sensor(s), and/or the like.

The mobile apparatus 402 may further include a battery pack module 430 that houses one or more batteries 432 to power the components of the mobile apparatus 402. The battery pack module 430 may include rechargeable batteries. In some examples, the battery pack module 430 may be detachably coupled to the frame 404 of the mobile apparatus 402 such that the battery pack module 430 may be removed and taken to a charging station. In various examples, the battery pack module 430 may include rechargeable batteries that may be charged when the mobile apparatus 402 is placed in a cart corral (e.g., through electrical contacts, power cords, etc.). In various examples, the frame 404 and/or basket 410 may have one or more channels (e.g., grooves, holes, paths, tunnels, etc.) through which power cables/cords may pass. In this way, power cables may be run at least partially through the channels in the frame 404 and/or basket 410 inconspicuously to provide power to the various components of the mobile apparatus 402.

In some examples, the mobile apparatus 402 may include a bar that is configured to protect one or more components of the mobile apparatus 402, such as the handlebar module 414. The bar may extend between at least the side portions 404(2) of the main frame 404. As such, and in some examples, the bar may be configured to protect the handlebar module 414 by preventing the gate from contacting the handlebar module 414 when the gate moves between the first position and the second position. Additionally, in some examples, the bar may be configured to protect the handlebar module 414 by preventing an additional basket of an additional mobile apparatus from contacting the handlebar module 414, such as when the mobile apparatuses are nested.

The main frame 404 of the mobile apparatus 402 may be connected to a bottom frame 404(3) that includes components for providing mobility to the mobile apparatus 402. For instance, the bottom frame 404(3) may support wheel castors (also to enable movement of the mobile apparatus 402 along a surface. The wheel casters may include wheels, axles, forks, joints or other components which enable the mobile apparatus 402 to travel on various surfaces. For instance, in some examples each of the wheel casters may include a single wheel provided on an axle within a fork, or two or more wheels provided on such an axle. In some other examples, the wheel casters may include two or more axles. Alternatively, in still other examples, a single caster may be provided in lieu of the multiple wheel casters.

Figure 5:
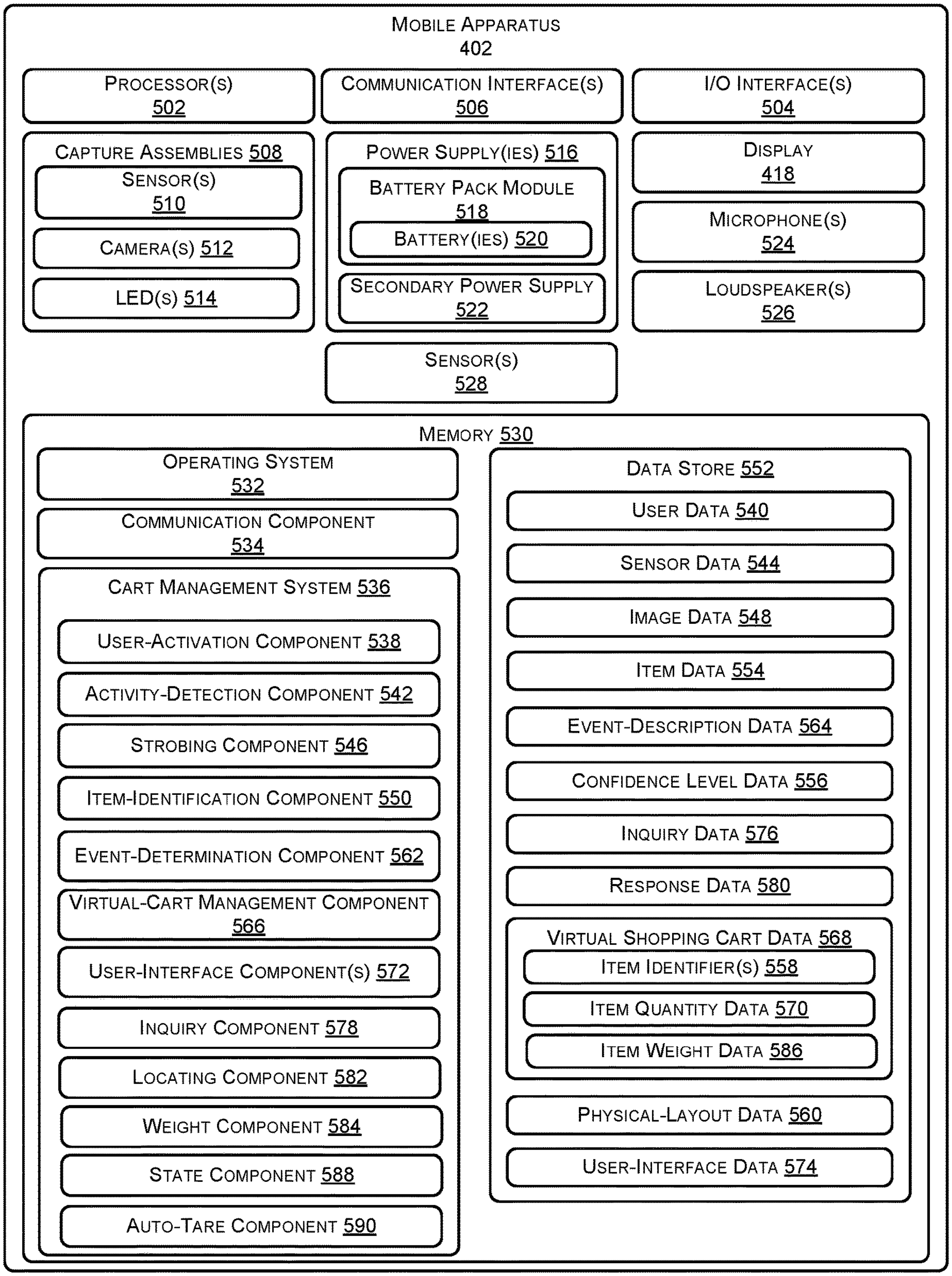
FIG. 5 illustrates example components of a mobile apparatus configured to support at least a portion of the functionality of an auto-tare system, according to at least some examples.

FIG. 5 illustrates example components of a mobile apparatus 402 configured to support at least a portion of the functionality of an auto-tare system, according to at least one example. The mobile apparatus 402 may include one or more hardware processors 502 (processors) (which may represent, and/or include, the processor(s) 108) configured to execute one or more stored instructions. The processor(s) 502 may comprise one or more cores. The mobile apparatus 402 may include one or more I/O interface(s) 504 (which may represent, and/or include, the I/O interface(s) 114) to allow the processor(s) 502 or other portions of the mobile apparatus 402 to communicate with other devices. The I/O interface(s) 504 may comprise Inter-Integrated Circuit (I2C), Serial Peripheral Interface bus (SPI), Universal Serial Bus (USB) as promulgated by the USB Implementers Forum, and so forth. The I/O interface(s) 504 may allow the various modules/components to communicate with each other and/or control each other.

The mobile apparatus 402 may also include one or more communication interfaces 506 (which may represent, and/or include, the communication interface(s) 110). The communication interface(s) 506 are configured to provide communications between the mobile apparatus 402 and other devices, such as the server(s), sensors, interface devices, routers, and so forth. The communication interface(s) 506 may include devices configured to couple to personal area networks (PANs), wired and wireless local area networks (LANs), wired and wireless wide area networks (WANs), and so forth. For example, the communication interfaces 506 may include devices compatible with Ethernet, Wi-Fi™, and so forth. The mobile apparatus 402 may also include one or more busses or other internal communications hardware or software that allow for the transfer of data between the various modules and components of the mobile apparatus 402.

The mobile apparatus 402 may also include the one or more capture assemblies 508 (which may represent, and/or include, the one or more capture assemblies) that each include one or more sensors 510, a camera 512, and one or more LEDs 514. In some examples, the sensor(s) 510 may comprise any type of sensor that is able to detect the presence of nearby objects without the need for physical contact (e.g., ToF sensor(s), PIR sensor(s), capacitive sensor(s), etc.). The cameras 512 in each of the capture assemblies 508 may comprise any type of camera or imaging device configured to generate image data (and/or video data), or information descriptive of a plurality of picture elements or pixels. The LED(s) 514 may be selectively activated to emit light at any wavelength, visible or non-visible to users. In some examples, one or more capture assemblies 508 may additionally, or alternatively, be facing downward into the basket 410 of the mobile apparatus 402. Additionally, the mobile apparatus 402 may include one or more cameras 512 that are outward facing in that generate image data representing the facility around the mobile apparatus 402.

The mobile apparatus 402 may include one or more power supply(ies) 516 to provide power to the components of the mobile apparatus 402, such as a battery pack module 518 (e.g., the battery), which include one or more batteries 520. The power supply(ies) 516 may also include a secondary (e.g., internal) power supply 522 to allow for hot swapping of battery pack modules 518, such as one or more capacitors, internal batteries, etc.

The mobile apparatus 402 may also include the display 418 configured to display content represented by image data, such as pictures, videos, user interface elements, and/or any other image data. The display 418 may comprise any type of display 418, and may further be a touch screen to receive touch input from a user. The mobile apparatus 402 may also include one or more microphones 524 (which may represent, and/or include, the microphone(s)) and one or more loudspeakers 526 (which may represent, and/or include, the loudspeaker(s)) to facilitate a dialogue with a user, and/or to receive feedback from the user. The microphone(s) 524 may capture sound representing the user's speech, and the loudspeaker(s) 526 may output machine-generated words to facilitate a dialogue, prompt a user for feedback on an item and/or for other information, and/or output other alerts or notifications.

The mobile apparatus 402 may also include other types of sensor(s) 528 (which may represent, and/or include, the sensor(s) 112). As described herein, these sensor(s) may include weight sensor(s) (e.g., weight scale 116) with loadcell(s), where, in some examples, the loadcell(s) are located between the basket 410 and the chassis 408.

The mobile apparatus 402 may include one or more memories 530 (which may represent, and/or include, the memory). The memory 530 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 530 provides storage of computer-readable instructions, data structures, program modules, and other data for the operation of the mobile apparatus 402. A few example functional modules are shown stored in the memory 530, although the same functionality may alternatively be implemented in hardware, firmware, or as a system on a chip (SOC).

The memory 530 may include at least one operating system (OS) component 532. The OS component 532 is configured to manage hardware resource devices such as the I/O interface(s) 504, the communication interface(s) 506, and provide various services to applications or components executing on the processor(s) 502. The OS component 532 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 530. These components may be executed as foreground applications, background tasks, daemons, and so forth. A communication component 534 may be configured to establish communications with one or more of the sensors, one or more of the servers, or other devices. The communications may be authenticated, encrypted, and so forth.

The memory 530 may further store a cart management system 536. The cart management system 536 is configured to provide the item-identifying functions (and other functions) provided by the mobile apparatus 402 as described herein. For example, the cart management system 536 may be configured to detect items, identify items, and maintain a virtual shopping cart for a user of the mobile apparatus 402.

The cart management system 536 may include a user-activation component 538 that performs operations for activating a shopping session using the mobile apparatus 402 on behalf of a user. For instance, a user may have previously registered for a user account with an operator of the facility to utilize various automated management services provided by an operator of the facility. The user may have registered for a user account, such as by providing user data 540, to automate payments made for items taken by the user and included a payment means (e.g., credit card, bank account number, etc.), and may have also provided an identification means in the user data 540 to the user-activation component 538 such that the mobile apparatus 402 can recognize the user. For instance, the user may have registered to identify themselves to the mobile apparatus 402 using any identification technique by the user-activation component 538, such as by providing the user data 540 by presenting an identification means to a camera/scanner 512 (e.g., presenting a driver's license, presenting a facility-issued card, presenting a user identifier via a mobile phone, etc.), and/or speaking a predefined utterance that is captured by the microphone(s) 524 (e.g., a name of the user, a predefined keyword, etc.). Once a user has identified themselves using the user-activation component 538, the user-activation component 538 may open a shopping session where the mobile apparatus 402 identifies and track items retrieved by the user and placed in the mobile apparatus 402.

The cart management system 536 may additionally include an activity-detection component 542 configured to detect items (or objects) within a particular proximity to the mobile apparatus 402. For example, the capacitive sensor(s) 528 may generate sensor data 544. The activity-detection component 542 may then analyze the sensor data 544 in order to determine a capacitance detected by the capacitive sensor(s) 528. Additionally, the activity-detection component 542 may use the capacitance to perform one or more of the processes described herein to detect the presence of a user. For example, the activity-detection component 542 may use the capacitance to determine if the user is located proximate to the mobile apparatus 402, the user is located over the perimeter of the mobile apparatus 402, determine if the user is located within the opening of the mobile apparatus 402, determine if the user is in contact with the cart, and/or the like.

The cart management system 536 may further include a strobing component 546 configured to cause the LED(s) 514 and/or shutters of the camera(s) 512 to strobe according to different frequencies. As noted above, the LED(s) 514 may emit light in any light spectrum (e.g., infrared, near infrared, visible, etc.). However, some items may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the LED(s) 514 to emit light in the visible spectrum.

When generating image data 548 using camera(s) 512, motion blur may appear when capturing fast moving objects. However, the motion blur may be reduced or eliminated by exposing the camera(s) 512 imager for a short (e.g., sub-millisecond) durations. Accordingly, the strobing component 546 may strobe the opening and closing of shutters of the camera(s) 512 to limit the sensor exposure duration. Additionally, the strobing component 546 may cause the LEDs 514 to emit/strobe light at a particular frequency.

The cart management system 536 may also include an item-identification component 550 configured to analyze image data 548 to identify an item represented in the image data 548. The image data 548 may comprise information descriptive of a plurality of picture elements, or pixels, for one or more image frames (e.g., a still picture, multiple picture frames, video frames, etc.). The item-identification component 550 may analyze the image data 548 using various image processing techniques, or computer vision techniques. For instance, the item-identification component 550 may extract a representation of an item depicted in the image data 548 generated by at least one of the camera(s) 512. The representation may include identifying text printed on the item, colors or color schemes printed on the item, 2-D and/or 3D shapes of the item, and/or other techniques for extract a representation of the item. In some instances, the representation of the item depicted in the image data 548 may comprise a numeric representation, such as a feature vector or a set of feature vectors.

In some examples, a data store 552 stored in the memory 530 may include item data 554, which may include representations of the items offered for acquisition at the facility. The item-identification component 550 may compare the extracted represented of the item with the "gallery" or stored representations of the known items in the item data 554. In some instance, the item representation may include an indication of a barcode or SKU data for the item as recognized in, or extracted from, the image data 548. The item-identification component 550 may determine confidence level data 556 based on the comparisons with item representation in the item data 554. The item-identification component 550 may determine, and assign, confidence levels indicating how likely it is that the item represented in the image data 548 corresponds to an item from the item gallery in the item data 554. Based on the confidence level data 556, the item-identification component 550 may determine an item identifier 558 for the item in the image data 548 (or multiple item identifiers 558) that corresponds to an item in the item data 554 to which the item corresponds.

In some examples, the data store 552 may include physical-layout data 560 that is used by the item-identification component 550 to determine the item. The physical-layout data 560 may include or provide a mapping of physical locations within the physical layout of devices and objects such that the location of the mobile apparatus 402 may be utilized to determine an item stored nearby. The physical-layout data 560 may indicate the coordinates within the facility of an inventory location, items stored at that inventory location, and so forth. In examples where the mobile apparatus 402 has location determining sensors (e.g., GPS, RFID, proximity, etc.), the location sensor data may be used to determine where in the store the user is located. In such examples, the item-identification component 550 may access the physical-layout data 560 to determine if a location associated with the event is associated with a location, and confidence levels for the corresponding representations of items in the item data 554. Continuing the example above, given the location within the facility of the event and image camera data, the physical-layout data 560 may determine the items that may have been represented in generated images of the event.

The cart management system 536 may further include an event-determination component 562 to determine event-description data 564 for the item in the image data 548. The event-determination component 562 may determine if the user is adding an item to the mobile apparatus 402, removing the item from the mobile apparatus 402, etc., based on movement of the item and/or whether the item is shown in the image data 548. For instance, if the item is shown as being moved downward towards the interior of the mobile apparatus 402, and the user's hand then leaves the basket without the item, it can be determined that the user added the item to the mobile apparatus 402. Similarly, if the user's hand moves into the cart without an item, and is depicted in the image data 548 taking an item from the cart, the event-determination component 562 may determine that the user removed an item from the mobile apparatus 402.

The cart management system 536 may also include a virtual-cart management component 566 configured to manage virtual shopping cart data 568 for the mobile apparatus 402. For instance, the virtual-cart management component 566 may utilize the item data 554, event-description data 564, and confidence level data 556 to add item identifier(s) 558 to the virtual shopping cart data 568 for items that were added to the mobile apparatus 402, remove item identifier(s) 558 from the virtual shopping cart data 568 for items that were removed from the mobile apparatus 402, and track item quantity data 570 indicating quantities of particular items in the mobile apparatus 402.

The cart management system 536 may further include a user-interface component 572 configured to present user interfaces on the display based on user-interface data 574. The user interfaces may include one or more fields to present data, and/or receive touch input (or other input via a keyboard, mouse, etc.) from a user. For instance, if the item-identification component 550 is unable to determine an item identifier 558 for an item shown in the image data 548, the user-interface component 572 may receive inquiry data 576 generated by an inquiry component 578 to prompt a user for feedback to help identify the item, and/or other information (e.g., if multiple items were placed in the mobile apparatus 402). The inquiry component 578 may be configured to generate inquiry data 576 based on the information needed to identify the item. For instance, the inquiry data 576 may include a prompt to request particular feedback from the user, such as to provide input (e.g., touch input, vocal/utterance input, etc.) to identify the item, input to indicate how many items were added to the mobile apparatus 402, input to indicate whether an item was removed or added, etc. In some examples, the user-interface component 572 may present one or more images depicting items from the item data 554 that have the highest confidence levels as corresponding to the item in the image data 548, but confidence levels that are not high enough to make a final decision as to the item. For instance, the user-interface component 572 may present pictures of two different items that have high confidence levels and request that the user select or indicate the appropriate item. Additionally, or alternatively, the user-interface component 572 may present user-interface data 574 that prompts the user for feedback regarding whether or not the item was added to, or removed from the mobile apparatus 402. The user-interface component 572 may then receive response data 580 representing a selection of an item.

In some examples, the cart management system 536 may further include a locating component 582 configured to determine locations of the mobile apparatus 402 in the facility. For instance, the locating component 582 may analyze sensor data 544 collected by sensors of the mobile apparatus 402 to determine a location. In some examples, the communication interface(s) 506 may include network interfaces that configured the mobile apparatus 402 to receive or detect wireless signals (e.g., WiFi signals, Bluetooth signals, etc.) and generate sensor data 544 indicative of the signals. The locating component 582 may analyze the sensor data 544 using various techniques to identify the location of the mobile apparatus 402, such as WiFi triangulation, received signal strength indicators (RSSI), and/or other methods for analyzing wireless signals to determine a location of the mobile apparatus 402. In some instances, the facility may include various infrared (IR) or near-IR emitters at different locations that emit light according to frequencies, patterns, etc. that indicate the different locations in the facility. In such examples, the mobile apparatus 402 may include a light sensor to generate the sensor data 544 representing the IR or NIR and determine the location of the mobile apparatus 402 in the facility. In some instances, there may be visible landmarks or markers throughout the facility that indicate a location in the facility, and the locating component 582 may analyze image data 548 generated by an outward facing camera 512 to determine a location of the mobile apparatus 402. As another example, there may be various radio frequency (RF) emitters positioned throughout the store, and the mobile apparatus 402 may include an RF receiver to allow the locating component 582 to perform IR beaconing to determine the location of the mobile apparatus 402. The locating component 582 may perform one, or any combination, of the above techniques to determine a location of the mobile apparatus 402 in the facility and/or any other technique known in the art.

The locating component 582 may perform various operations based on determining the location of the mobile apparatus 402 within the facility. For instance, the locating component 582 may cause user-interface data 574 to be presented on the display that includes a map of the facility and/or directions to an item for the user of the mobile apparatus 402. Additionally, or alternatively, the locating component 582 may utilize the location of the cart, the physical-layout data 560, and/or item data 554 and "push" user interfaces to the display 418 that indicate various location-based information, such as indications of deals for items located nearby, indications of items located nearby and on the user's shopping list, and/or other user-interface data 574.

The mobile apparatus 402 may include a weight component 584 that is configured to determine weight(s) of item(s) located within the basket 410. For a first example, the weight component 584 may receive sensor data 544 generated by sensor(s) 528, where the sensor(s) 528 include the loadcell(s) of the weight sensor associated with the basket 410. The weight component 584 may then be configured to analyze the sensor data 544 in order to determine a weight associated with the basket 410. For example, the weight component 584 may be configured to analyze the sensor data 544 in order to determine the respective weight measured by each of the loadcell(s). When the weight sensor includes more than one loadcell, the weight component 584 may then be configured to determine the weight associated with the basket 410 using the determined weights. For example, the weight sensor may determine the weight associated with the basket 410

The weight component 584 may use these weights to determine the weight of the item placed within the basket 410. For example, the weight component 584 may perform the processes above in order to determine a first weight associated with the basket 410 at a first time. The weight component 584 may then perform the processes above in order to determine a second weight associated with the basket 410 at a second, later time. In some examples, the weight component 584 receives the sensor data 544 and/or determines the weights at the elapse of given time periods (e.g., every second, two seconds, five seconds, etc.). In some examples, the weight component 584 receives the sensor data 544 and/or determines the weights based on detecting that an item has been placed within the basket 410, such as based on the output from the activity-detection component 542, the item-identification component 550, and/or the event-determination component 562. In either example, the weight component 584 may use the first weight and the second weight to determine the weight of the item.

For example, the weight component 584 may determine whether the second weight is greater than the first weight. If the weight component 584 determines that the second weight substantially equal to the first weight, then the weight component 584 may determine that a new item has not been placed within the basket 410. However, if the weight component 584 determines that the second weight greater than the first weight, then the weight component 584 may determine that a new item has been placed within the basket 410. In some examples, the weight component 584 may then determine the weight of the item using the weights, such as by taking the difference between the second weight and the first weight.

Additionally, or alternatively, in some examples, the weight component 584 may use the first weight and the second weight to determine that an item has been removed from the basket 410. For example, the weight component 584 may determine that the second weight is less than the first weight. Based on the determination, the weight component 584 may determine that an item has been removed from the basket 410. In some examples, the weight component 584 may then determine the weight of the item using the weights, such as by taking the difference between the first weight and the second weight. Additionally, if the mobile apparatus 402 already knows the weights of each of the items, the mobile apparatus 402 may determine which item was removed by matching the weight of the item removed to the weight of one of the items within the basket 410.

In some examples, the weight component 584 (and/or another component) may perform one or more processes using the weights associated with the items. For a first example, if an item is priced per unit weight, then the weight component 584 (and/or another component) may determine a price of the item using the weight and the price per unit weight. For instance, the weight component 584 may determine the price as the weight of the item multiplied by the price per unit weight. In such examples, the item data 554 may represent the price per unit weight of the item. For instance, if the price per unit weight of the item is $1.00 for every pound, and the measured weight of the item is 10 pounds, then the weight component 584 may determine that the price of the item is $10.00. When performing processes for determining the price of the item using the weight, the mobile apparatus 402 may initially confirm that the weight of the item is accurate. For instance, the mobile apparatus 402 may use a sensor 528, such as an IMU sensor, to verify that the mobile apparatus 402 is stationary and/or located on a flat surface before performing the processes of determining the weight of the item. By verifying that the mobile apparatus 402 is stationary and/or on a flat surface, the mobile apparatus 402 may be configured to determine a more accurate weight of the item.

For a second example, the weight component 584 (and/or another component, such as the item-identification component 550) may verify an item that has been added to or removed from the mobile apparatus 402. For instance, and as discussed above, the item-identification component 550 may determine an initial identity of an item, such as by analyzing image data generated by one or more of the capture assemblies 508, using one or more of the processes described herein. The weight component 584 may then determine a weight of an item added to the mobile apparatus 402. Additionally, the weight component 584 (and/or another component, such as the item-identification component 550) may use the weight to verify the initial identity of the item. For instance, the item data 554 may represent the expected weights of items, such as the weight of the item. The weight component 584 (and/or the other component) may then compare the weight of the first item as represented by the item data 554 to the weight of the item as measured by the weight sensor(s). The weight component 584 (and/or the other component) may then verify the identity of the item when the measured weight is within a threshold percentage to the weight represented by the item data 554, or the weight component 584 (and/or the other component) may not verify the identity of the item when the measured weight is outside of the threshold weight. The threshold may include, but is not limited to, 0.1%, 0.5%, 1%, and/or any other percentage. When performing such processes, the weight component 584 (and/or the other component) are able to verify the identities of items add to the mobile apparatus 402 and/or items removed from the mobile apparatus 402.

For a third example, the weight component 584 (and/or another component) may determine a number of items added to the mobile apparatus 402. For instance, the item-identification component 550 may again determine an identity of item(s) added to the mobile apparatus 402 while the weight component 584 determines the weight of the item(s). The weight component 584 (and/or the other component) may then determine the number of the item(s) added to the mobile apparatus 402. For instance, the weight component 584 (and/or the other component) may use the item data 554 to determine the weight per unit item associated with the identified item(s). The weight component 584 (and/or the other component) may then determine the number of items using the measured weight and the weight per unit item. In some instances, the weight component 584 (and/or the other component) may determine the number of items by dividing the measured weight by the weight per unit item. For instance, if the weight per unit item is 1 pound per unit item and the measured weight is 10 pounds, then the weight component 584 (and/or the other component) may determine that the number of items is 10 items.

In some examples, the virtual-cart management component 566 may be configured to generate item weight data 586 representing the weight of the items, which the virtual-cart management component 566 may store as part of the virtual shopping cart data 568. Additionally, in some examples, the item data 554 may represent the price per unit weight of the item and/or the number of items. The mobile apparatus 402 may then be configured to provide the price of the item to the user, such as using the display 418.

The mobile apparatus 402 may include a state component 588. As described herein, the mobile apparatus 402 may include sensor(s) 528 (which may represent, and/or include, the sensors 308) to determine when a user is located proximate to the mobile apparatus 402, when a user is not located proximate to the mobile apparatus 402, when the mobile apparatus 402 is not nested, when the mobile apparatus 402 is nested, and/or the like. Additionally, the mobile apparatus 402 may switch between states based on these determinations. For example, the mobile apparatus 402 may operate in a first state when a user is located proximate to the mobile apparatus 402 and/or when the mobile apparatus 402 is not nested. Additionally, the mobile apparatus 402 may operate in a second, different state when a user is not located proximate to the mobile apparatus 402 and/or when the mobile apparatus 402 is nested. As such, the state component 588 may be configured to cause the mobile apparatus to switch between the states.

In some examples, the mobile apparatus 402 may use more power when operating in the first state than when operating in the second state. For example, when operating in the first state, the mobile apparatus 402 may activate at least a majority of the components of the mobile apparatus 402, such as the display 418, the capture assemblies 508, the sensor(s) 528, the communication interface(s) 506, the microphone(s) 524, the loudspeaker(s) 526, and/or the like. Additionally, when operating in the second state, the mobile apparatus 402 may deactivate one or more components of the mobile apparatus 402, such as the display 418, the capture assemblies 508, the sensor(s) 528, the communication interface(s) 506, the microphone(s) 524, the loudspeaker(s) 526, and/or the like. By deactivating the one or more components, the mobile apparatus 402 may use less power when operating in the second state. Additionally, or alternatively, the mobile apparatus 402 may include auto-tare component 590. The auto-tare component 590 may be configured to use sensor-based detection techniques so that a weight scale associated with the mobile apparatus 402 may be automatically tared.

Figure 6:
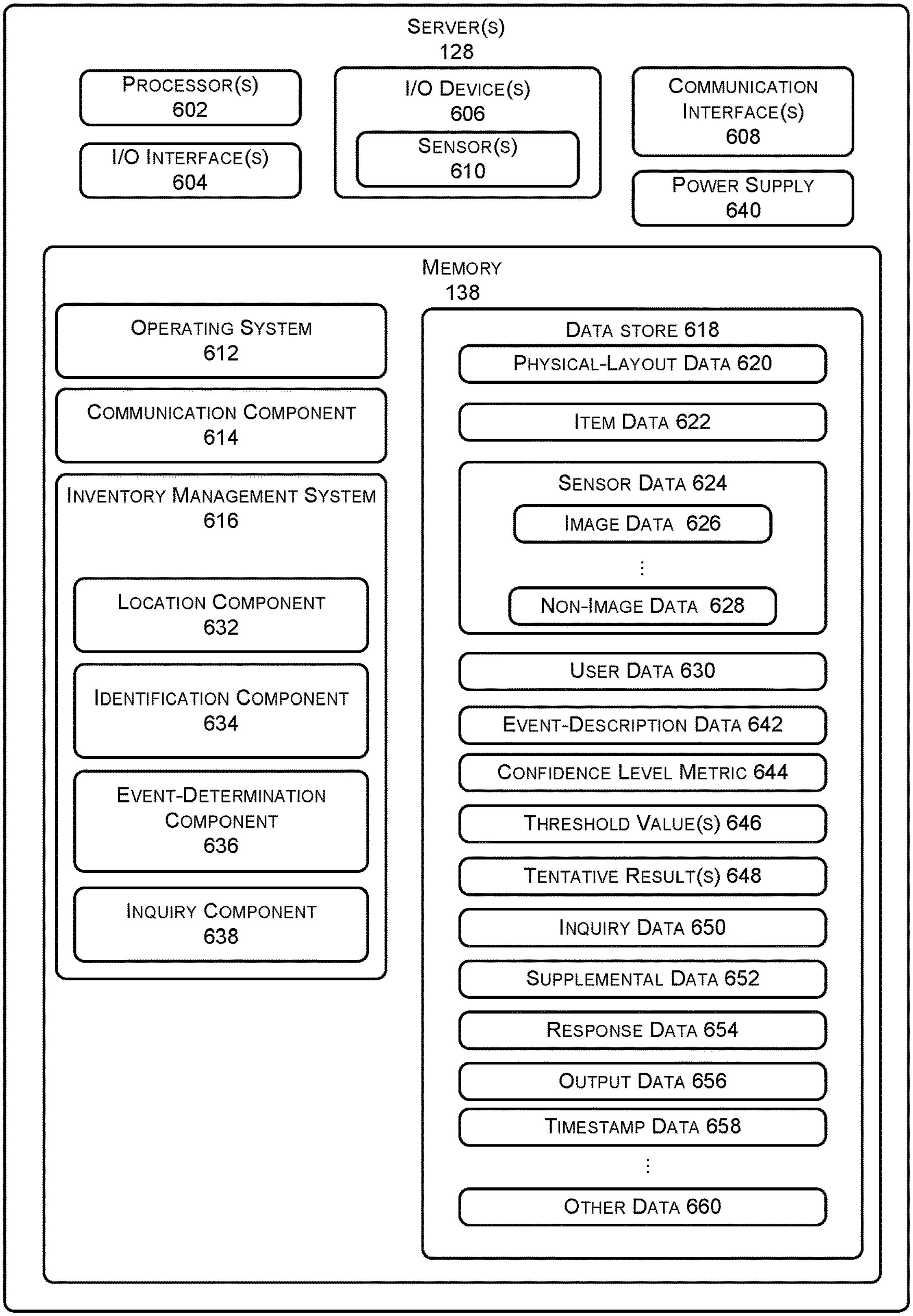
FIG. 6 illustrates example components of one or more systems configured to support an inventory-management system, according to at least some examples.

FIG. 6 illustrates example components of one or more servers configured to support an inventory-management system using the techniques described herein.

As illustrated, the servers 128 may be physically present at the facility 102, may be accessible by the network 126, or a combination of both. The servers 128 do not require end-user knowledge of the physical location and configuration of the system that delivers the services. Common expressions associated with the servers 128 may include "on-demand computing," "software as a service (SaaS)," "cloud services," "data centers," and so forth. Services provided by the servers 128 may be distributed across one or more physical or virtual devices.

The servers 128 may include one or more hardware processors 602 (processors) configured to execute one or more stored instructions. The processors 602 may comprise one or more cores. The servers 128 may include one or more input/output (I/O) interface(s) 604 to allow the processor 602 or other portions of the servers 128 to communicate with other devices. The I/O interfaces 604 may comprise Inter-Integrated Circuit (I2C), Serial Peripheral Interface bus (SPI), Universal Serial Bus (USB) as promulgated by the USB Implementers Forum, and so forth. The servers 128 may also include I/O device(s) 606 and sensor(s) 610.

The servers 128 may also include one or more communication interfaces 608. The communication interfaces 608 are configured to provide communications between the servers 128 and other devices, such as the sensors 308, the interface devices, routers, and so forth. The communication interfaces 608 may include devices configured to couple to personal area networks (PANs), wired and wireless local area networks (LANs), wired and wireless wide area networks (WANs), and so forth. For example, the communication interfaces 608 may include devices compatible with Ethernet, Wi-Fi™, and so forth. The servers 128 may also include one or more busses or other internal communications hardware or software that allow for the transfer of data between the various modules and components of the servers 128.

The servers 128 may also include a power supply 640. The power supply 640 is configured to provide electrical power suitable for operating the components in the servers 128.

The servers 128 may further include one or more memories 138. The memory 138 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 138 provides storage of computer-readable instructions, data structures, program modules, and other data for the operation of the servers 128. A few example functional modules are shown stored in the memory 138, although the same functionality may alternatively be implemented in hardware, firmware, or as a system on a chip (SOC).

The memory 138 may include at least one operating system (OS) component 612. The OS component 612 is configured to manage hardware resource devices such as the I/O interfaces 604, the communication interfaces 608, and provide various services to applications or components executing on the processors 602. The OS component 612 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 138. These components may be executed as foreground applications, background tasks, daemons, and so forth. A communication component 614 may be configured to establish communications with one or more of the sensors 308, one or more of the devices used by associates, other servers 128, or other devices. The communications may be authenticated, encrypted, and so forth.

The memory 138 may store an inventory management system 616. The inventory management system 616 is configured to provide the inventory functions as described herein with regard to the inventory management system 318. For example, the inventory management system 616 may track movement of items 304 in the facility 102, generate user interface data, determine product locations/coordinates, determine product volumes to update a planogram, and so forth.

The inventory management system 616 may access information stored in one or more data stores 618 in the memory 138. The data store 618 may use a flat file, database, linked list, tree, executable code, script, or other data structure to store the information. In some implementations, the data store 618 or a portion of the data store 618 may be distributed across one or more other devices including other servers 128, network attached storage devices, and so forth.

The data store 618 may include physical layout data 620. The physical layout data 620 provides a mapping of physical locations within the physical layout of devices and objects such as the sensors 308, inventory locations 314, and so forth. The physical layout data 620 may indicate the coordinates within the facility 102 of an inventory location 314, sensors 308 within view of that inventory location 314, and so forth. For example, the physical layout data 620 may include camera data comprising one or more of a location within the facility 102 of a camera 308(1), orientation of the camera 308(1), the operational status, and so forth. Continuing the example, the physical layout data 620 may indicate the coordinates of the camera 308(1), pan and tilt information indicative of a direction that the field of view 310 is oriented along, whether the camera 308(1) is operating or malfunctioning, and so forth. The physical-layout data 620 may include planogram data indicating the physical coordinates or different product lanes, as described above, relative to the cameras and other devices.

In some implementations, the inventory management system 616 may access the physical layout data 620 to determine if a location associated with the event 322 is within the field of view 310 of one or more sensors 308. Continuing the example above, given the location within the facility 102 of the event 322 and the camera data, the inventory management system 616 may determine the cameras 308(1) that may have generated images of the event 322.

The item data 622 comprises information associated with the items 304. The information may include information indicative of one or more inventory locations 314 at which one or more of the items 304 are stored. In some implementation, planogram data may be included in the item data to indicate the locations of the inventory locations 314. The item data 622 may also include order data, SKU or other product identifier, price, quantity on hand, weight, expiration date, images of the item 304, detail description information, ratings, ranking, and so forth. The inventory management system 616 may store information associated with inventory management functions in the item data 622.

The data store 618 may also include sensor data 624. The sensor data 624 comprises information acquired from, or based on, the one or more sensors 308. For example, the sensor data 624 may comprise 3D information about an object in the facility 102. As described above, the sensors 308 may include a camera 308(1), which is configured to acquire one or more images. These images may be stored as the image data 626. The image data 626 may comprise information descriptive of a plurality of picture elements or pixels. Non-image data 628 may comprise information from other sensors 308, such as input from the microphones, weight sensors, item dispensers, and so forth.

User data 630 may also be stored in the data store 618. The user data 630 may include identity data, information indicative of a profile, purchase history, location data, images of the user 104, demographic data, and so forth. Individual users 104 or groups of users 104 may selectively provide user data 630 for use by the inventory management system 318. The individual users 104 or groups of users 104 may also authorize collection of the user data 630 during use of the facility 102 or access to user data 630 obtained from other systems. For example, the user 104 may opt-in to collection of the user data 630 to receive enhanced services while using the facility 102.

In some implementations, the user data 630 may include information designating a user 104 for special handling. For example, the user data 630 may indicate that a particular user 104 has been associated with an increased number of errors with respect to output data 320. The inventory management system 616 may be configured to use this information to apply additional scrutiny to the events 322 associated with this user 104. For example, events 322 that include an item 304 having a cost or result above the threshold amount may be provided to the associates for processing regardless of the determined level of confidence in the output data 320 as generated by the automated system.

The inventory management system 616 may include one or more of a location component 632, identification component 634, event-determination component 636, inquiry component 638, and a planogram component 660, amongst other components 656. The inventory management system 616 may include a planogram component 660 that is responsible for determining product volumes and for updating planogram data.

The location component 632 functions to locate items or users within the environment of the facility to allow the inventory management system 616 to assign certain events to the correct users. The location component 632 may assign unique identifiers to users as they enter the facility and, with the users' consent, may locate the users throughout the facility 102 over the time they remain in the facility 102. The location component 632 may perform this locating using sensor data 624, such as the image data 626. For example, the location component 632 may receive the image data 626 and may use recognition techniques to identify users from the images. After identifying a particular user within the facility, the location component 632 may then locate non-personally-identifying information associated with the user within the images as the user moves throughout the facility 102.

Therefore, upon receiving the indication of the time and location of the event in question, the location component 632 may query the data store 618 to determine which one or more users were at or within a threshold distance of the location of the event at the particular time of the event. Further, the location component 632 may assign different confidence levels to different users, with the confidence levels indicating how likely it is that each corresponding user is the user that is in fact associated with the event of interest.

The location component 632 may access the sensor data 624 in order to determine this location data of the user and/or items. The location data provides information indicative of a location of an object, such as the item 304, the user 104, the cart 106, and so forth. The location data may include planogram data, such as the planogram data 124. In some instances, the planogram data comprises coordinates of the bounding boxes or product volumes described above, with each bounding box or product volume associated with a particular item identifier. The specified locations of the planogram data may be absolute with respect to the facility 102 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 102, 5.2 m from an inventory location 314 along a heading of 169°, and so forth. For example, the location data may indicate that the user 104(1) is 25.2 m along the aisle 312 and standing in front of the inventory location 314. In comparison, a relative location may indicate that the user 104(1) is 8 cm from the cart 106 at a heading of 73° with respect to the cart 106. The location data may include orientation information, such as which direction the user 104 is facing. The orientation may be determined by the relative direction the user's body is facing. In some implementations, the orientation may be relative to the interface device. Continuing the example, the location data may indicate that the user 104(1) is oriented with a heading of 0°, or looking north. In another example, the location data may indicate that the user 104 is facing towards the interface device.

The identification component 634 is configured to identify an object. In one implementation, the identification component 634 may be configured to identify an item 304. In another implementation, the identification component 634 may be configured to identify the user 104. For example, the identification component 634 may use recognition techniques to process the image data 626 and determine the identity data of the user 104 depicted in the images by comparing the characteristics in the image data 626 with previously stored results. The identification component 634 may also access data from other sensors 308, such as from an RFID reader, an RF receiver, fingerprint sensors, and so forth.

The event-determination component 636 is configured to process the sensor data 624 and generate output data 320. The event-determination component 636 may access information stored in the data store 618 including, but not limited to, event description data 642, confidence levels 644, or threshold values 646. The event-determination component 636 may be configured to create and utilize event classifiers for identifying events (e.g., predefined activity) within image data, potentially without use of other sensor data acquired by other sensors in the environment.

The event description data 642 comprises information indicative of one or more events 322. For example, the event description data 642 may comprise predefined profiles that designate movement of an item 304 from an inventory location 314 with the event 322 of "pick". The event description data 642 may be manually generated or automatically generated. The event description data 642 may include data indicative of triggers associated with events occurring in the facility 102. An event may be determined as occurring upon detection of the trigger. For example, sensor data 624 such as a change in weight from a weight sensor 308(6) at an inventory location 314 may trigger detection of an event of an item 304 being added or removed from the inventory location 314. In another example, the trigger may comprise an image of the user 104 reaching a hand toward the inventory location 314. In yet another example, the trigger may comprise two or more users 104 approaching to within a threshold distance of one another.

The event-determination component 636 may process the sensor data 624 using one or more techniques including, but not limited to, artificial neural networks, classifiers, decision trees, support vector machines, Bayesian networks, and so forth. For example, the event-determination component 636 may use a decision tree to determine occurrence of the "pick" event 322 based on sensor data 624. The event-determination component 636 may further use the sensor data 624 to determine one or more tentative results 648. The one or more tentative results 648 comprise data associated with the event 322. For example, where the event 322 comprises a disambiguation of users 104, the tentative results 648 may comprise a list of possible user identities. In another example, where the event 322 comprises a disambiguation between items 304, the tentative results 648 may comprise a list of possible item identifiers. In some implementations, the tentative result 648 may indicate the possible action. For example, the action may comprise the user 104 picking, placing, moving an item 304, damaging an item 304, providing gestural input, and so forth.

In some implementations, the tentative results 648 may be generated by other components. For example, the tentative results 648 such as one or more possible identities or locations of the user 104 involved in the event 322 may be generated by the location component 632. In another example, the tentative results 648 such as possible items 304 that may have been involved in the event 322 may be generated by the identification component 634.

The event-determination component 636 may be configured to provide a confidence level 644 associated with the determination of the tentative results 648. The confidence level 644 provides indicia as to the expected level of accuracy of the tentative result 648. For example, a low confidence level 644 may indicate that the tentative result 648 has a low probability of corresponding to the actual circumstances of the event 322. In comparison, a high confidence level 644 may indicate that the tentative result 648 has a high probability of corresponding to the actual circumstances of the event 322.

In some implementations, the tentative results 648 having confidence levels 644 that exceed the threshold may be deemed to be sufficiently accurate and thus may be used as the output data 320. For example, the event-determination component 636 may provide tentative results 648 indicative of the three possible items 304(1), 304(2), and 304(3) corresponding to the "pick" event 322. The confidence levels 644 associated with the possible items 304(1), 304(2), and 304(3) may be 25%, 70%, 92%, respectively. Continuing the example, the threshold value 646 may be set such that confidence level 644 of 90% are deemed to be sufficiently accurate. As a result, the event-determination component 636 may designate the "pick" event 322 as involving item 304(3).

The inquiry component 638 may be configured to use at least a portion of the sensor data 624 associated with the event 322 to generate inquiry data 650. In some implementations, the inquiry data 650 may include one or more of the tentative results 648 or supplemental data 652. The inquiry component 638 may be configured to provide inquiry data 650 to one or more devices associated with one or more human associates.

An associate user interface is presented on the respective devices of associates. The associate may generate response data 654 by selecting a particular tentative result 648, entering new information, indicating that they are unable to answer the inquiry, and so forth.

The supplemental data 652 comprises information associated with the event 322 or that may be useful in interpreting the sensor data 624. For example, the supplemental data 652 may comprise previously stored images of the items 304. In another example, the supplemental data 652 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data during presentation to an associate.

The inquiry component 638 processes the response data 654 provided by the one or more associates. The processing may include calculating one or more statistical results associated with the response data 654. For example, statistical results may include a count of the number of times associates selected a particular tentative result 648, determination of a percentage of the associates that selected a particular tentative result 648, and so forth.

The inquiry component 638 is configured to generate the output data 320 based at least in part on the response data 654. For example, given that a majority of the associates returned response data 654 indicating that the item 304 associated with the "pick" event 322 is item 304(5), the output data 320 may indicate that the item 304(5) was picked.

The inquiry component 638 may be configured to selectively distribute inquiries to particular associates. For example, some associates may be better suited to answering particular types of inquiries. Performance data, such as statistical data about the performance of the associates, may be determined by the inquiry component 638 from the response data 654 provided by the associates. For example, information indicative of a percentage of different inquiries in which the particular associate selected response data 654 that disagreed with the majority of associates may be maintained. In some implementations, test or practice inquiry data 650 having a previously known correct answer may be provided to the associate for training or quality assurance purposes. The determination of the set of associates to use may be based at least in part on the performance data.

By using the inquiry component 638, the event-determination component 636 may be able to provide high reliability output data 320 that accurately represents the event 322. The output data 320 generated by the inquiry component 638 from the response data 654 may also be used to further train the automated systems used by the inventory management system 616. For example, the sensor data 624 and the output data 320, based on response data 654, may be provided to one or more of the components of the inventory management system 616 for training in process improvement. Continuing the example, this information may be provided to an artificial neural network, Bayesian network, and so forth, to further train these systems such that the confidence level 644 and the tentative results 648 produced in the future for the same or similar input is improved. The servers 128 may store and/or utilize other data 658.

Disclosures may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, disclosures may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 7:
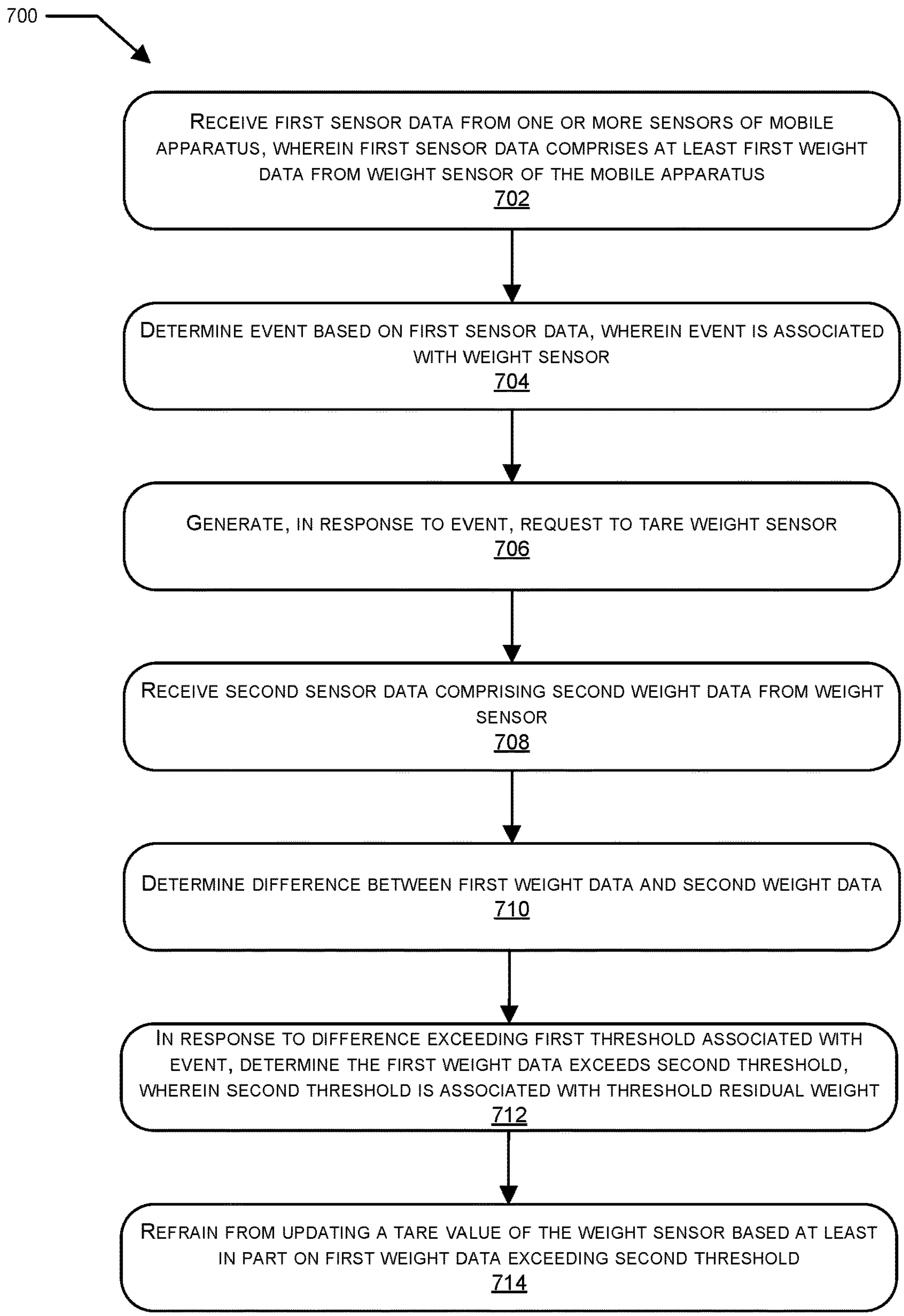
FIG. 7 illustrates a flow diagram of an example process associated with an auto-tare system, according to at least some examples.

FIG. 7 illustrates a flow diagram of an example process associated with auto-taring weight scales, according to at least some examples. The order in which the operations or steps are described is not intended to be construed as a limitation, and any number of described operations may be combined in any order and/or in parallel to implement process 700.

At block 702, the process 700 may include receiving first sensor data from one or more sensors of a mobile apparatus, wherein the first sensor data comprises at least first weight data from a weight sensor of the mobile apparatus. For example, a user may be engaging in purchasing items from the facility using the cart. The cart may include one or more sensors, as well as weight scale. In this example, the weight scale may be configured to detect when produce items are placed in the cart. The sensors may be a camera configured to detect event associated with the cart. For example, sensors may capture image data, video data, visual data, and the like, of the contents of the cart and recognize, through computer vision techniques, items that are placed into the cart and/or other events associated with the cart. The sensors may also include accelerometers, motion sensors, and the like. The cart may include weight scale that may be used to detect when items have been placed into the cart and/or other events associated with the cart and/or weight scale. In some examples, the weight scale may be used when produce items are placed in the cart by the user, where the produce items are weighed in order to be added to the user's virtual cart. The cart may also be equipped with, or associated with, a user interface device configured to receive input from the user. For example, the cart may receive input from the user indicating an event that could cause a weight change with the weight scale, such as an input made via I/O interfaces (e.g., touch screen, mouse, keyboard, etc.) of a user interface component presented on a display at the cart. The I/O interfaces may comprise Inter-Integrated Circuit (I2C), Serial Peripheral Interface bus (SPI), Universal Serial Bus (USB) as promulgated by the USB Implementers Forum, RS-232, and so forth. The cart may also include one or more hardware processors configured to executed one or more stored instructions. The processors may comprise one or more cores.

Once the sensors and/or the weight scale have obtained sensor data, the cart may send (e.g., upload, stream, etc.) the sensor data to the servers over one or more networks using one or more communication interface(s). The servers may be connected to the cart over one or more networks. In some examples, the servers may be physically present at the facility, may be at a remote location accessible by networks, or a combination of both. Additionally, or alternatively, the servers may be associated with an auto-tare system configured to automatically tare the weight scale associated with the cart. One or more components of the auto-tare system may store the sensor data in memory, such that the sensor data may be used in order to determine whether to automatically tare the weight scale.

At block 704, the process 700 may include determining an event based on the first sensor data, wherein the event is associated with the weight sensor. Continuing from the example above, the sensors may obtain sensor data, which may indicate an event associated with the cart and/or the weight scale (e.g., event data). For example, the event data may indicate that the weight scale has stopped moving (e.g., the user pushing the cart has stopped in order to add an item into the cart). The event data may indicate that the user has placed an item on the weight scale, and subsequently removed the item (e.g., the user changed their mind on a produce item they were planning on purchasing). Additionally, or alternatively, the event data may indicate any other event detected by the sensors that would cause a change in weight of the weight scale (e.g., the cart crashes into another cart or object, causing items in the cart to inadvertently fall on the weight scale). In some examples, the sensor data may also include scale stability data, and indicate a degree of stability associated with the weight scale.

At block 706, the process 700 may include generating, in response to the event, a request to tare the weight sensor. In some instances, the auto-tare system may receive the sensor data, and the auto-tare system may use, or work in conjunction with, the tare requestor component to generate tare requests. For example, the auto-tare system may be associated with a tare requestor component that is configured to generate tare requests based on the event data associated with the weight scale, where a change in the weight scale reading may occur despite the user of the cart not actively adding a produce item to the cart. Accordingly, the tare requestor component may receive sensor data including the event data, where the tare requestor component may be configured to identify the weight change event. In some instances, the tare requestor component may analyze the sensor data in order to identify the weight change event (e.g., a change in movement associated with the weight scale, an item being place and/or removed from the weight scale, a change in contents of the cart, input from user indicating a change with the cart, and the like). Accordingly, when the tare requestor component identifies a weight change event, the tare requestor component may generate a tare request for the weight scale.

At block 708, the process 700 may include receiving second sensor data comprising second weight data from the weight sensor.

At block 710, the process 700 may include determining a difference between the first weight data and the second weight data. For example, the auto-tare system, upon generating a tare request for the weight scale, may use, or work in conjunction with, the tare fulfiller component in order to execute the tare request (i.e., scale action) based on the weight data indicating an explained weight change that is in accordance with the event. In examples where the event is identified by the tare requestor component based on the sensor data, and a tare request generated, the tare fulfiller component may cause the weight scale to be tared based on a variety of factors. For example, the tare fulfiller component may receive the tare request and event data indicating the event that caused a weight change associated with the weight scale. Based on the event data, the tare fulfiller component may be configured to validate the tare request. For example, the tare fulfiller component may receive weight data. The weight data may include weight data associated with the weight scale before the event. The weight data may also include weight data associated with the weight scale after the event. For example, before the occurrence of the event, such as a change in movement of the cart causing a change in reading by the weight scale, the weight data may indicate a weight scale reading of zero (e.g., the weight scale may have been previously tared or "zeroed out"). After the event, the weight scale may have a reading of 5 grams despite no new items being added to the cart (e.g., the change in movement of the cart caused items in the cart to shift, and in turn, cause a change in reading by the weight scale.

At block 712, the process 700 may include, in response to the difference exceeding a first threshold associated with the event, determining the first weight data exceeds a second threshold, wherein the second threshold is associated with a threshold residual weight. In some instances, the one or more components of auto-tare system may also store threshold data in memory, such that the threshold data may be used by the tare fulfiller component in determining whether to execute the tare request for weight scale. The tare fulfiller component may use the threshold data to determine a comparison between the threshold data and the weight data associated with the weight scale before the event and the weight data associated with the weight scale after the event. The threshold data may indicate a standard threshold for all types of events. In some instances, each type of event may be associated with certain threshold (e.g., some events may be associated with a greater change in weight than other events). For example, an event where the user adds a produce item to the cart, and then removes the item, may have a lower threshold of weight change than the threshold of weight change associated with a change in cart movement. For example, the event may be associated with a threshold of 20 grams, such that when the weight data indicates a change in weight after the event that is within the threshold of 20 grams, the tare fulfiller component may execute the tare request and cause the weight scale to be tared (i.e., tare action).

At block 714, the process 700 may include refraining from updating a tare value of the weight sensor based at least in part on the first weight data exceeding the second threshold. For example, in some instances, the auto-tare system may be configured to use, or work in combination with, the non-tare detection component in order to perform scale action, such as causing the weight scale to be disabled, reset, and/or the like in some circumstances. For example, the non-tare detection component may disable the weight scale after the tare fulfiller component is unable to cause scale action to be executed (i.e., unable to fulfill the tare request) due to an unexplained event (e.g., the difference between weight data before an event and weight data after the event does not correspond to a threshold weight change associated with an event). Additionally, or alternatively, non-tare detection component may receive an indication of the unexplained event, where the tare fulfiller component was unable to automatically cause the weight scale to tare. In some instances, based on threshold data, the non-tare detection component may cause scale action to occur, such as causing the weight scale to be disabled, reset, and/or the like. For example, the threshold data may include an indication of a residual weight threshold, where the residual weight threshold may indicate a threshold weight prior to the event such that future weight readings of produce items by the weight scale may be accurate or inaccurate. The tare detection component may use the threshold data indicating the residual weight threshold and weight data indicating the weight reading of the weight scale before the event to determine whether the weight reading of the weight scale before the event violates the residual weight threshold. If the weight reading of the weight scale before the event violates the residual weight threshold (e.g., exceeds the threshold), the tare detection component may cause the scale action to be performed, such as disabling the weight scale until it may be re-tared. In some instances, such as when the weight scale is not auto-tared, the weight scale may be re-tared by the user, an associate of the facility, and the like. In some examples, if the weight reading of the weight scale prior to the event is within the residual weight threshold, then the reading of the weight scale may remain unchanged. The user may be able to add produce items to the cart, where the produce items may be weighed and added to the user's virtual cart.

Additionally, or alternatively, the process 700 may include, wherein the event is a first event and the difference is a first difference, receiving third sensor data from the one or more sensors, wherein the third sensor data comprises at least third weight data from the weight sensor of the mobile apparatus, and determining a second event based on the third sensor data, wherein the second event is associated with the weight sensor. The process 700 may also include receiving fourth sensor data comprising fourth weight data from the weight sensor, determining a second difference between the third weight data and the fourth weight data, and, in response to the difference being less than a third threshold associated with the second event, causing the weight sensor to be tared.

Additionally, or alternatively, the process 700 may include receiving, from the one or more sensors, stability data associated with the weight sensor, determining the stability data is less than a threshold stability value associated with the weight sensor, and in response to the stability data being less than the threshold stability value, determining the difference between the first weight data and the second weight data.

Additionally, or alternatively, the process 700 may include wherein the event includes at least one of a change in movement associated with the one or more sensors, a first item being placed on the one or more sensors, a second item being removed from the one or more sensors, a visual change detected by one or more sensors associated with the one or more sensors, a weight change detected by the one or more sensors associated with the one or more sensors, and/or a user input data indicating a change associated with the one or more sensors.

Figure 8:
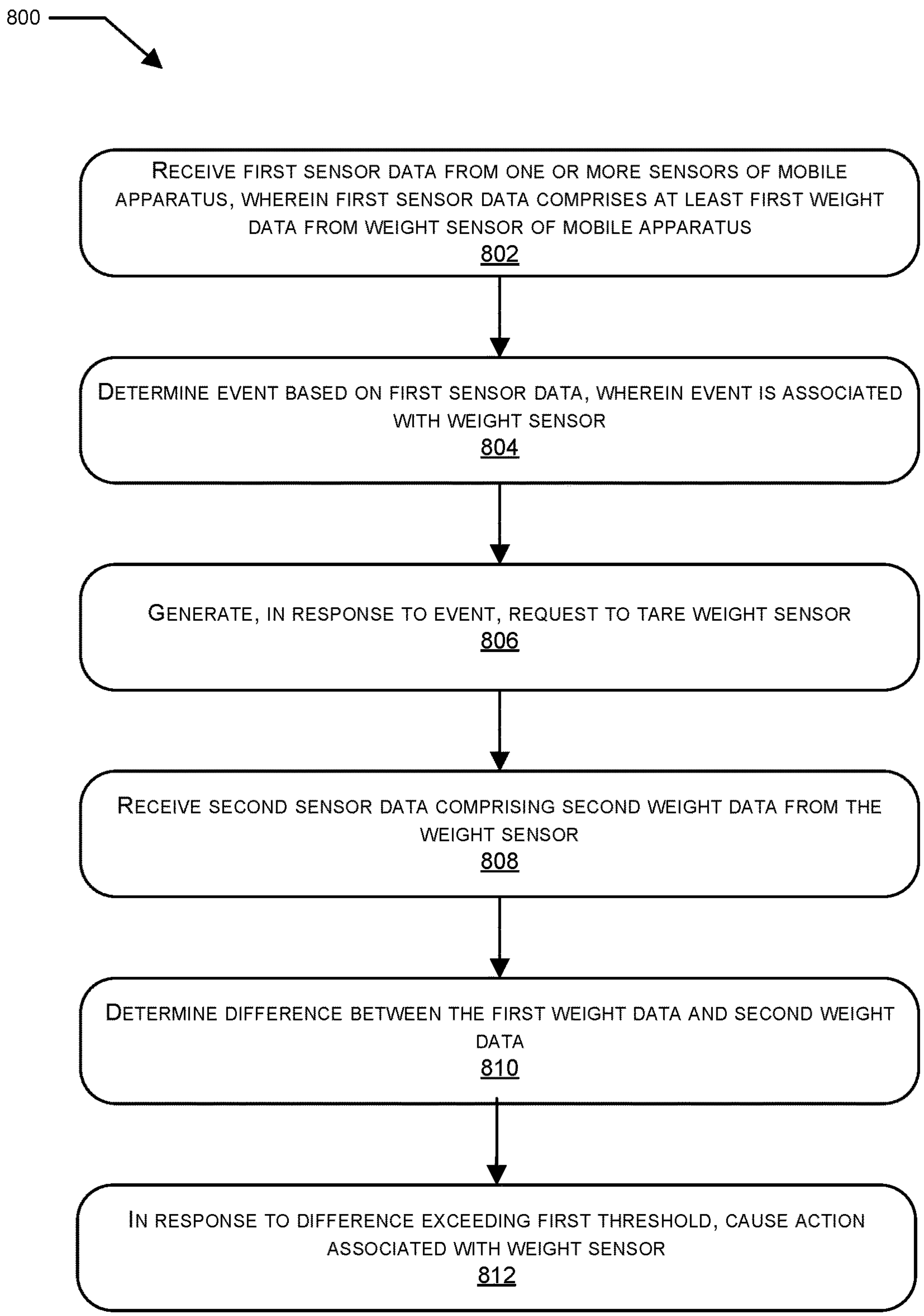
FIG. 8 illustrates a flow diagram of another example process associated with an auto-tare system, according to at least some examples.

FIG. 8 illustrates a flow diagram of another example process associated with auto-taring weight scales, according to at least some examples. The order in which the operations or steps are described is not intended to be construed as a limitation, and any number of described operations may be combined in any order and/or in parallel to implement process 800.

At block 802, the process 800 may include receiving first sensor data from one or more sensors of a mobile apparatus, wherein the first sensor data comprises at least first weight data from a weight sensor of the mobile apparatus. For example, a user may be engaging in purchasing items from the facility using the cart. The cart may include one or more sensors, as well as weight scale. In this example, the weight scale may be configured to detect when produce items are placed in the cart. The sensors may be a camera configured to detect event associated with the cart. For example, sensors may capture image data, video data, visual data, and the like, of the contents of the cart and recognize, through computer vision techniques, items that are placed into the cart and/or other events associated with the cart. The sensors may also include accelerometers, motion sensors, and the like. The cart may include weight scale that may be used to detect when items have been placed into the cart and/or other events associated with the cart and/or weight scale. In some examples, the weight scale may be used when produce items are placed in the cart by the user, where the produce items are weighed in order to be added to the user's virtual cart. The cart may also be equipped with, or associated with, a user interface device configured to receive input from the user. For example, the cart may receive input from the user indicating an event that could cause a weight change with the weight scale, such as an input made via I/O interfaces (e.g., touch screen, mouse, keyboard, etc.) of a user interface component presented on a display at the cart. The I/O interfaces may comprise Inter-Integrated Circuit (I2C), Serial Peripheral Interface bus (SPI), Universal Serial Bus (USB) as promulgated by the USB Implementers Forum, RS-232, and so forth. The cart may also include one or more hardware processors configured to executed one or more stored instructions. The processors may comprise one or more cores.

Once the sensors and/or the weight scale have obtained sensor data, the cart may send (e.g., upload, stream, etc.) the sensor data to the servers over one or more networks using one or more communication interface(s). The servers may be connected to the cart over one or more networks. In some examples, the servers may be physically present at the facility, may be at a remote location accessible by networks, or a combination of both. Additionally, or alternatively, the servers may be associated with an auto-tare system configured to automatically tare the weight scale associated with the cart. One or more components of the auto-tare system may store the sensor data in memory, such that the sensor data may be used in order to determine whether to automatically tare the weight scale.

At block 804, the process 800 may include determining an event based on the first sensor data, wherein the event is associated with the weight sensor. Continuing from the example above, the sensors may obtain sensor data, which may indicate an event associated with the cart and/or the weight scale (e.g., event data). For example, the event data may indicate that the weight scale has stopped moving (e.g., the user pushing the cart has stopped in order to add an item into the cart). The event data may indicate that the user has placed an item on the weight scale, and subsequently removed the item (e.g., the user changed their mind on a produce item they were planning on purchasing). Additionally, or alternatively, the event data may indicate any other event detected by the sensors that would cause a change in weight of the weight scale (e.g., the cart crashes into another cart or object, causing items in the cart to inadvertently fall on the weight scale). In some examples, the sensor data may also include scale stability data, and indicate a degree of stability associated with the weight scale.

At block 806, the process 800 may include generating, in response to the event, a request to tare the weight sensor. In some instances, the auto-tare system may receive the sensor data, and the auto-tare system may use, or work in conjunction with, the tare requestor component to generate tare requests. For example, the auto-tare system may be associated with a tare requestor component that is configured to generate tare requests based on the event data associated with the weight scale, where a change in the weight scale reading may occur despite the user of the cart not actively adding a produce item to the cart. Accordingly, the tare requestor component may receive sensor data including the event data, where the tare requestor component may be configured to identify the weight change event. In some instances, the tare requestor component may analyze the sensor data in order to identify the weight change event (e.g., a change in movement associated with the weight scale, an item being place and/or removed from the weight scale, a change in contents of the cart, input from user indicating a change with the cart, and the like). Accordingly, when the tare requestor component identifies a weight change event, the tare requestor component may generate a tare request for the weight scale.

At block 808, the process 800 may include receiving second sensor data comprising second weight data from the weight sensor.

At block 810, the process 800 may include determining a difference between the first weight data and the second weight data. For example, the auto-tare system, upon generating a tare request for the weight scale, may use, or work in conjunction with, the tare fulfiller component in order to execute the tare request (i.e., scale action) based on the weight data indicating an explained weight change that is in accordance with the event. In examples where the event is identified by the tare requestor component based on the sensor data, and a tare request generated, the tare fulfiller component may cause the weight scale to be tared based on a variety of factors. For example, the tare fulfiller component may receive the tare request and event data indicating the event that caused a weight change associated with the weight scale. Based on the event data, the tare fulfiller component may be configured to validate the tare request. For example, the tare fulfiller component may receive weight data. The weight data may include weight data associated with the weight scale before the event. The weight data may also include weight data associated with the weight scale after the event. For example, before the occurrence of the event, such as a change in movement of the cart causing a change in reading by the weight scale, the weight data may indicate a weight scale reading of zero (e.g., the weight scale may have been previously tared or "zeroed out"). After the event, the weight scale may have a reading of 5 grams despite no new items being added to the cart (e.g., the change in movement of the cart caused items in the cart to shift, and in turn, cause a change in reading by the weight scale.

At block 812, the process 800 may include, in response to the difference exceeding a first threshold, causing an action associated with the weight sensor. In some instances, the one or more components of auto-tare system may also store threshold data in memory, such that the threshold data may be used by the tare fulfiller component in determining whether to execute the tare request for weight scale. The tare fulfiller component may use the threshold data to determine a comparison between the threshold data and the weight data associated with the weight scale before the event and the weight data associated with the weight scale after the event. The threshold data may indicate a standard threshold for all types of events. In some instances, each type of event may be associated with certain threshold (e.g., some events may be associated with a greater change in weight than other events). For example, an event where the user adds a produce item to the cart, and then removes the item, may have a lower threshold of weight change than the threshold of weight change associated with a change in cart movement. For example, the event may be associated with a threshold of 20 grams, such that when the weight data indicates a change in weight after the event that is within the threshold of 20 grams, the tare fulfiller component may execute the tare request and cause the weight scale to be tared (i.e., tare action).

Additionally, or alternatively, in some instances, the auto-tare system may be configured to use, or work in combination with, the non-tare detection component in order to perform scale action. For example, the non-tare detection component may disable, reset, and/or the like the weight scale after the tare fulfiller component is unable to cause scale action to be executed (i.e., unable to fulfill the tare request) due to an unexplained event (e.g., the difference between weight data before an event and weight data after the event does not correspond to a threshold weight change associated with an event). Additionally, or alternatively, non-tare detection component may receive an indication of the unexplained event, where the tare fulfiller component was unable to automatically cause the weight scale to tare. In some instances, based on threshold data, the non-tare detection component may cause scale action to occur, such as refraining from auto-taring the weight scale and/or causing the weight scale to be disabled. For example, the threshold data may include an indication of a residual weight threshold, where the residual weight threshold may indicate a threshold weight prior to the event such that future weight readings of produce items by the weight scale may be accurate or inaccurate. The tare detection component may use the threshold data indicating the residual weight threshold and weight data indicating the weight reading of the weight scale before the event to determine whether the weight reading of the weight scale before the event violates the residual weight threshold. If the weight reading of the weight scale before the event violates the residual weight threshold (e.g., exceeds the threshold), the tare detection component may cause the scale action to be performed, such as disabling the weight scale until it may be re-tared. In some instances, such as when the weight scale is not auto-tared, the weight scale may be re-tared by the user, an associate of the facility, and the like. In some examples, if the weight reading of the weight scale prior to the event is within the residual weight threshold, then the reading of the weight scale may remain unchanged. The user may be able to add produce items to the cart, where the produce items may be weighed and added to the user's virtual cart.

Additionally, or alternatively, the process 800 may include, wherein causing the action associated with the weight sensor further comprises determining the first weight data exceeds a second threshold, wherein the second threshold is associated with a threshold residual weight, and refraining from updating a tare value of the weight sensor based at least in part on the first weight data exceeding the second threshold.

Additionally, or alternatively, the process 800 may include wherein causing the action associated with the weight sensor further comprises determining the first weight data is less than a second threshold, wherein the second threshold is associated with a threshold residual weight, and causing display of an indication that an item weight may be accepted.

Additionally, or alternatively, the process 800 may include wherein the event includes at least one of a change in movement associated with the one or more sensors, a first item being placed on the one or more sensors, a second item being removed from the one or more sensors, a visual change detected by one or more sensors associated with the one or more sensors, a weight change detected by the one or more sensors associated with the one or more sensors, and/or a user input data indicating a change associated with the one or more sensors.

Additionally, or alternatively, the process 800 may include, wherein the event is a first event, and the difference is a first difference, receiving third sensor data from the one or more sensors, wherein the third sensor data comprises at least third weight data from the weight sensor of the mobile apparatus. The process 800 may further include determining a second event based on the third sensor data, wherein the second event is associated with the weight sensor, determining, in response to the second event, the request to tare the weight sensor, and receiving fourth sensor data comprising fourth weight data from the weight sensor. Additionally, or alternatively, the process 800 may include determining a second difference between the third sensor data and the fourth sensor data and in response to the second difference being less than a second threshold, causing the weight sensor to be tared.

Additionally, or alternatively, the process 800 may include wherein the first weight data indicates a first weight associated with the weight sensor prior to the event, and the second weight data indicates a second weight associated with the weight sensor after the event.

Additionally, or alternatively, the process 800 may include receiving, from the one or more sensors, stability data associated with the weight sensor, determining the stability data is less than a threshold stability value associated with the weight sensor, and in response to the stability data being less than the threshold stability value, determining the difference between the first weight data and the second weight data.

Additionally, or alternatively, the process 800 may include receiving, from the one or more sensors, stability data associated with the weight sensor, determining the stability data exceeds a threshold stability value associated with the weight sensor, and in response to the stability data exceeding the threshold stability value, refraining from determining the difference between the first weight data and the second weight data.

While the foregoing disclosure is described with respect to the specific examples, it is to be understood that the scope of the disclosure is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system for automatically taring weight sensors associated with carts in a facility, the system comprising:
- one or more processors; and
- one or more computer-readable media storing instructions that, when executed by the one or more processors, cause the one or more processors to perform operations comprising:
  - receiving first sensor data from one or more sensors of a mobile apparatus, wherein the first sensor data comprises at least first weight data from a weight sensor of the mobile apparatus;
  - determining an event based on the first sensor data, wherein the event is associated with the weight sensor;
  - generating, in response to the event, a request to tare the weight sensor;
  - receiving second sensor data comprising second weight data from the weight sensor;
  - determining a difference between the first weight data and the second weight data;
  - in response to the difference exceeding a first threshold associated with the event, determining the first weight data exceeds a second threshold, wherein the second threshold is associated with a threshold residual weight; and
  - refraining from updating a tare value of the weight sensor based at least in part on the first weight data exceeding the second threshold.

2. The system of claim 1, wherein the event is a first event and the difference is a first difference, the operations further comprising:

receiving third sensor data from the one or more sensors, wherein the third sensor data comprises at least third weight data from the weight sensor of the mobile apparatus;

determining a second event based on the third sensor data, wherein the second event is associated with the weight sensor;

receiving fourth sensor data comprising fourth weight data from the weight sensor;

determining a second difference between the third weight data and the fourth weight data; and in response to the difference being less than a third threshold associated with the second event, causing the weight sensor to be tared.

3. The system of claim 1, the operations further comprising:

receiving, from the one or more sensors, stability data associated with the weight sensor;

determining the stability data is less than a threshold stability value associated with the weight sensor; and in response to the stability data being less than the threshold stability value, determining the difference between the first weight data and the second weight data.

4. The system of claim 1, wherein the event includes at least one of:

a change in movement associated with the one or more sensors;

a first item being placed on the one or more sensors;

a second item being removed from the one or more sensors;

a visual change detected by one or more sensors associated with the one or more sensors;

a weight change detected by the one or more sensors associated with the one or more sensors; or a user input data indicating a change associated with the one or more sensors.

5. A method for automatically taring weight sensors associated with carts in a facility, the method comprising:

receiving first sensor data from one or more sensors of a mobile apparatus, wherein the first sensor data comprises at least first weight data from a weight sensor of the mobile apparatus;

determining an event based on the first sensor data, wherein the event is associated with the weight sensor;

generating, in response to the event, a request to tare the weight sensor;

receiving second sensor data comprising second weight data from the weight sensor;

determining a difference between the first weight data and the second weight data; and in response to the difference exceeding a first threshold, causing an action associated with the weight sensor.

6. The method of claim 5, wherein causing the action associated with the weight sensor further comprises:

determining the first weight data exceeds a second threshold, wherein the second threshold is associated with a threshold residual weight; and refraining from updating a tare value of the weight sensor based at least in part on the first weight data exceeding the second threshold.

7. The method of claim 5, wherein causing the action associated with the weight sensor further comprises:

determining the first weight data is less than a second threshold, wherein the second threshold is associated with a threshold residual weight; and causing display of an indication that an item weight may be accepted.

8. The method of claim 5, wherein the event includes at least one of:

a change in movement associated with the one or more sensors;

a first item being placed on the one or more sensors;

a second item being removed from the one or more sensors;

a visual change detected by one or more sensors associated with the one or more sensors;

a weight change detected by the one or more sensors associated with the one or more sensors; or a user input data indicating a change associated with the one or more sensors.

9. The method of claim 5, wherein the event is a first event, and the difference is a first difference, the method further comprising:

receiving third sensor data from the one or more sensors, wherein the third sensor data comprises at least third weight data from the weight sensor of the mobile apparatus;

determining a second event based on the third sensor data, wherein the second event is associated with the weight sensor;

determining, in response to the second event, the request to tare the weight sensor;

receiving fourth sensor data comprising fourth weight data from the weight sensor;

determining a second difference between the third sensor data and the fourth sensor data; and in response to the second difference being less than a second threshold, causing the weight sensor to be tared.

10. The method of claim 5, wherein the first weight data indicates a first weight associated with the weight sensor prior to the event, and the second weight data indicates a second weight associated with the weight sensor after the event.

11. The method of claim 5, further comprising:

receiving, from the one or more sensors, stability data associated with the weight sensor;

determining the stability data is less than a threshold stability value associated with the weight sensor; and in response to the stability data being less than the threshold stability value, determining the difference between the first weight data and the second weight data.

12. The method of claim 5, further comprising:

receiving, from the one or more sensors, stability data associated with the weight sensor;

determining the stability data exceeds a threshold stability value associated with the weight sensor; and in response to the stability data exceeding the threshold stability value, refraining from determining the difference between the first weight data and the second weight data.

13. A cart system comprising;

a sensor;

a camera;

a computing device; and a non-transitory storage medium having instructions stored thereon, that, when executed by the computing device, cause the computing device to perform operations comprising:

receiving first sensor data from one or more sensors of a mobile apparatus, wherein the first sensor data comprises at least first weight data from a weight sensor of the mobile apparatus;

determining an event based on the first sensor data, wherein the event is associated with the weight sensor;

generating, in response to the event, a request to tare the weight sensor;

receiving second sensor data comprising second weight data from the weight sensor;

determining a difference between the first weight data and the second weight data; and in response to the difference exceeding a first threshold, causing an action associated with the weight sensor.

14. The system of claim 13, wherein causing the action associated with the weight sensor further comprises:

determining the first weight data exceeds a second threshold, wherein the second threshold is associated with a threshold residual weight; and refraining from updating a tare value of the weight sensor based at least in part on the first weight data exceeding the second threshold.

15. The system of claim 13, wherein causing the action associated with the weight sensor further comprises:

determining the first weight data is less than a second threshold, wherein the second threshold is associated with a threshold residual weight; and causing display of an indication that an item weight may be accepted.

16. The system of claim 13, wherein the event includes at least one of:

a change in movement associated with the one or more sensors;

a first item being placed on the one or more sensors;

a second item being removed from the one or more sensors;

a visual change detected by one or more sensors associated with the one or more sensors;

a weight change detected by the one or more sensors associated with the one or more sensors; or a user input data indicating a change associated with the one or more sensors.

17. The system of claim 13, wherein the event is a first event, and the difference is a first difference, the operations further comprising:

receiving third sensor data from the one or more sensors, wherein the third sensor data comprises at least third weight data from the weight sensor of the mobile apparatus;

determining a second event based on the third sensor data, wherein the second event is associated with the weight sensor;

determining, in response to the second event, the request to tare the weight sensor;

receiving fourth sensor data comprising fourth weight data from the weight sensor;

determining a second difference between the third sensor data and the fourth sensor data; and in response to the second difference being less than a second threshold, causing the weight sensor to be tared.

18. The system of claim 13, wherein the first weight data indicates a first weight associated with the weight sensor prior to the event, and the second weight data indicates a second weight associated with the weight sensor after the event.

19. The system of claim 13, the operations further comprising:

receiving, from the one or more sensors, stability data associated with the weight sensor;

determining the stability data is less than a threshold stability value associated with the weight sensor; and in response to the stability data being less than the threshold stability value, determining the difference between the first weight data and the second weight data.

20. The system of claim 13, the operations further comprising:

receiving, from the one or more sensors, stability data associated with the weight sensor;

determining the stability data exceeds a threshold stability value associated with the weight sensor; and in response to the stability data exceeding the threshold stability value, refraining from determining the difference between the first weight data and the second weight data.

* * * * *